United States Patent
Bigelow

(10) Patent No.: US 7,377,783 B2
(45) Date of Patent: May 27, 2008

(54) MODULAR HUMAN HABITAT SIMULATOR

(75) Inventor: Robert T. Bigelow, Las Vegas, NV (US)

(73) Assignee: Bigelow Aerospace, North Las Vegas, NV (US)

( * ) Notice: Subject to any disclaimer, the term of this patent is extended or adjusted under 35 U.S.C. 154(b) by 919 days.

(21) Appl. No.: 10/665,605

(22) Filed: Sep. 16, 2003

(65) Prior Publication Data

US 2005/0058965 A1    Mar. 17, 2005

(51) Int. Cl.
*G09B 9/08* (2006.01)
(52) U.S. Cl. ..................... 434/34; 244/158.3
(58) Field of Classification Search ................ 434/34; 244/159, 158.3, 159.2
See application file for complete search history.

(56) References Cited

U.S. PATENT DOCUMENTS

| | | | |
|---|---|---|---|
| 3,084,454 A * | 4/1963 | Schueller ..................... 434/34 |
| 3,281,964 A * | 11/1966 | Hewes ........................ 434/34 |
| 3,295,223 A * | 1/1967 | Zeff et al. ................... 434/34 |
| 3,468,533 A * | 9/1969 | House, Jr. .................... 472/60 |
| 3,534,485 A * | 10/1970 | Simpson et al. .............. 434/34 |
| 4,347,055 A | 8/1982 | Geiger |
| 4,678,438 A | 7/1987 | Vykukal |
| 5,429,851 A * | 7/1995 | Sallee ......................... 428/71 |
| 5,453,011 A | 9/1995 | Feuer et al. |
| 5,616,030 A | 4/1997 | Watson |
| 5,791,903 A | 8/1998 | Feuer et al. |
| 6,231,010 B1 | 5/2001 | Schneider et al. |
| 6,439,508 B1 * | 8/2002 | Taylor ..................... 244/158.3 |
| 6,547,189 B1 | 4/2003 | Raboin et al. |
| 6,641,485 B1 * | 11/2003 | Chauhan ...................... 472/59 |

* cited by examiner

*Primary Examiner*—Cameron Saadat
(74) *Attorney, Agent, or Firm*—Franklin E. Gibbs

(57) ABSTRACT

A modular human habitat simulator for providing an environment on Earth that approximates, in a controlled test situation, a number of conditions expected to exist when an inflatable modular habitat is deployed into Earth orbit. The simulator has a housing with a rigid wall defining an internal volume, a longitudinal axis, a first and second opposing openings along the longitudinal axis, the rigid wall having an exterior surface, and an interior surface where the interior surface is generally the shape of an interior surface of a deployed inflatable shell of a modular human habitat, and the internal volume is substantially that of a deployed inflatable modular human habitat volume.

17 Claims, 23 Drawing Sheets

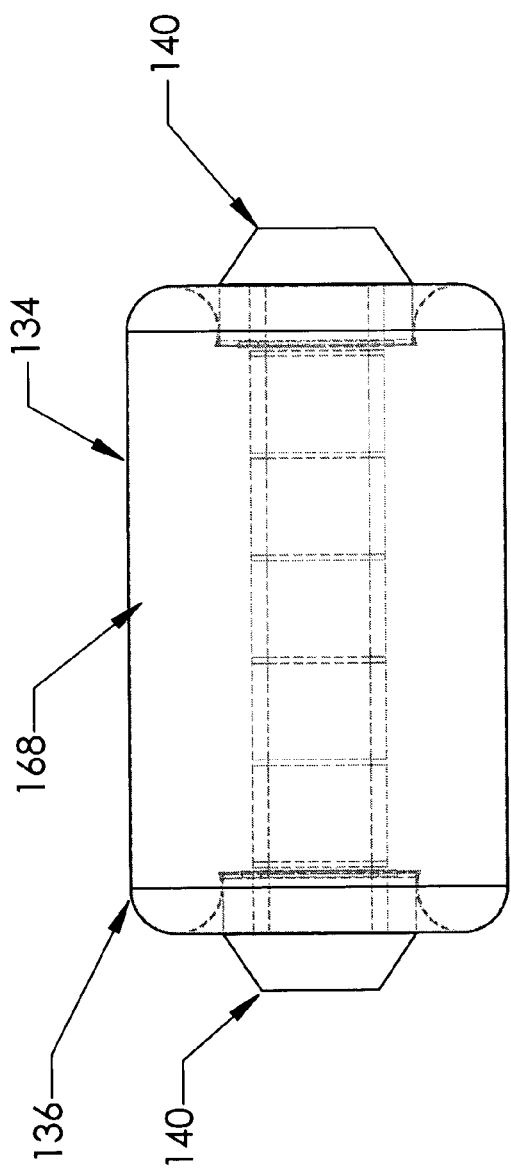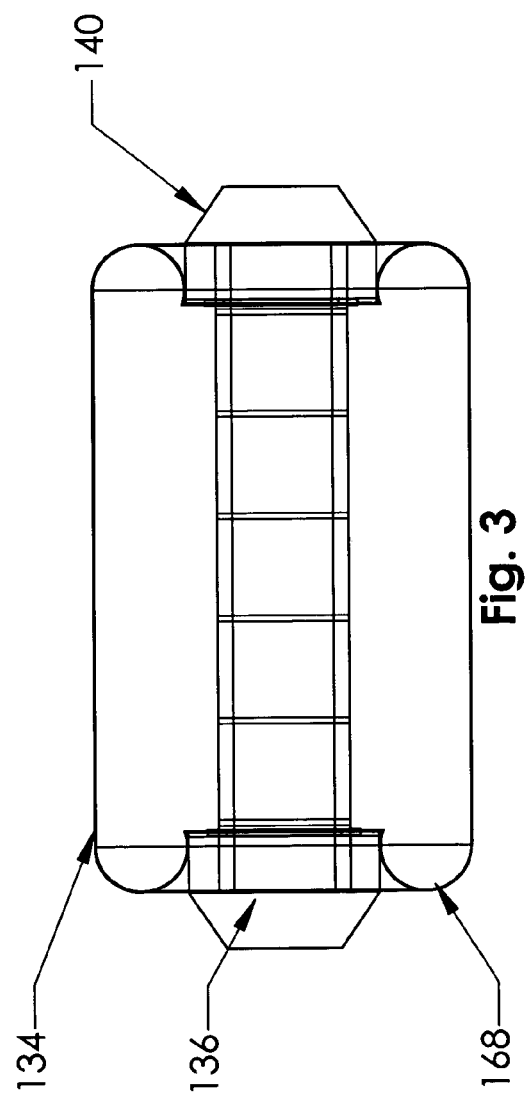

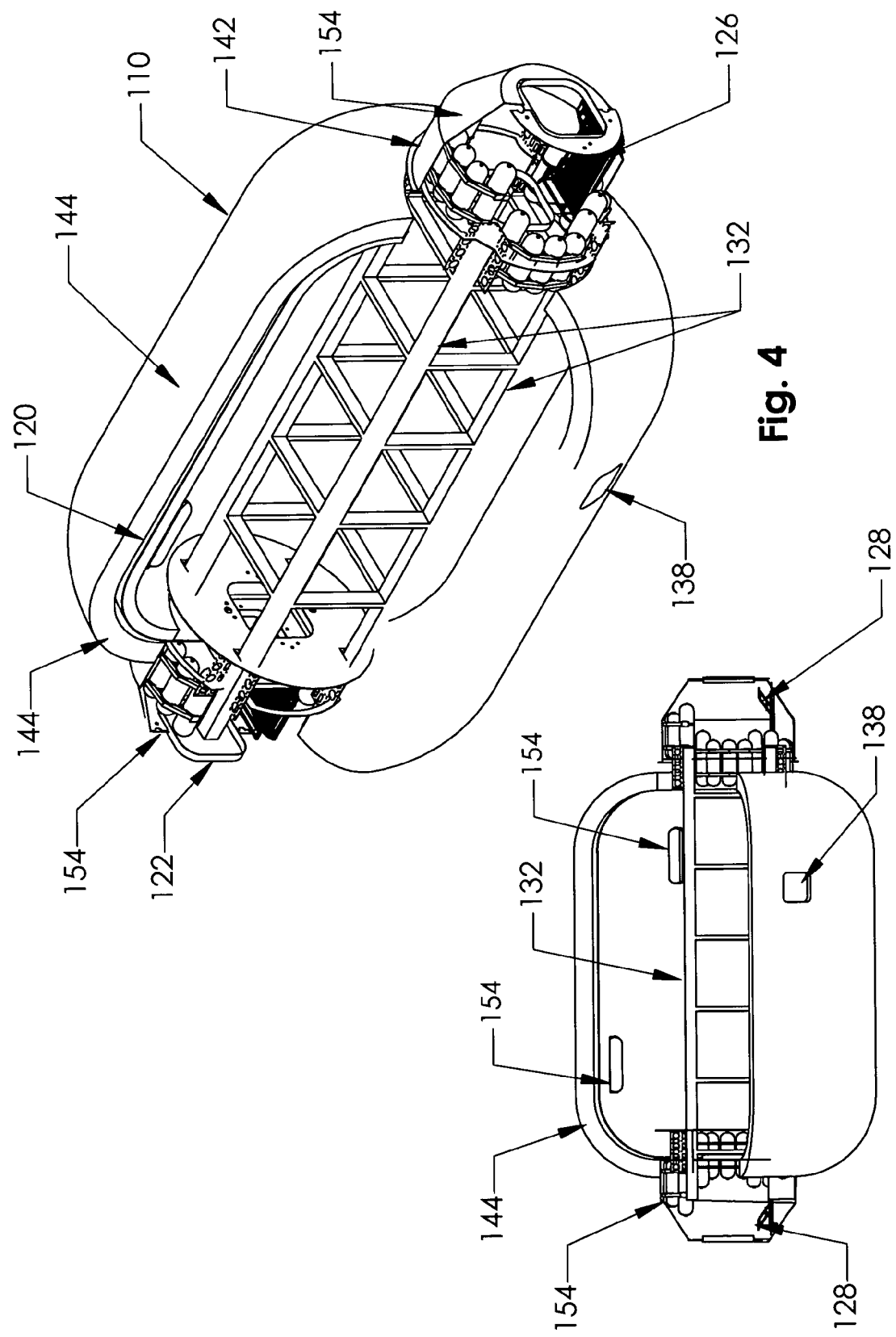

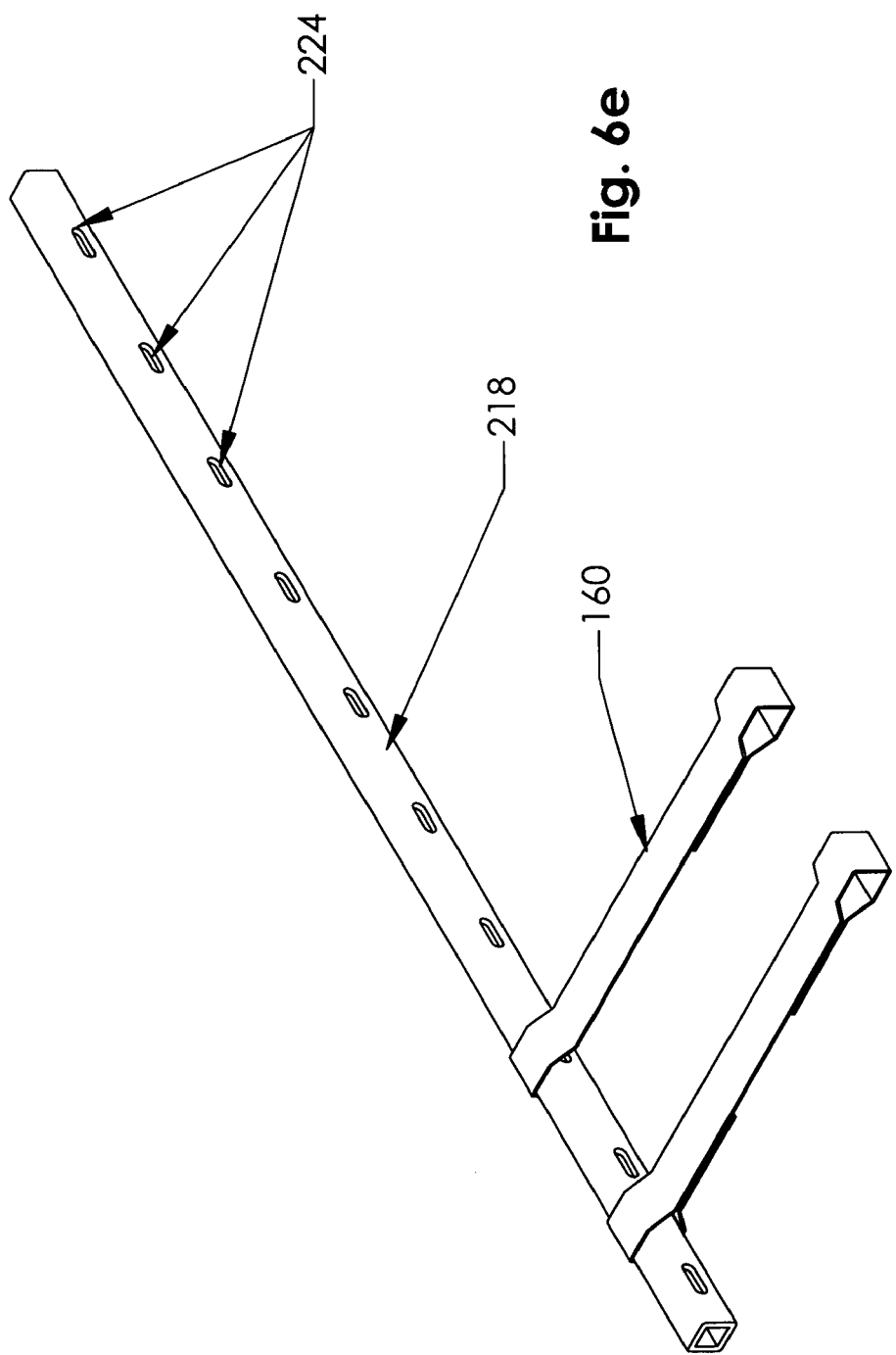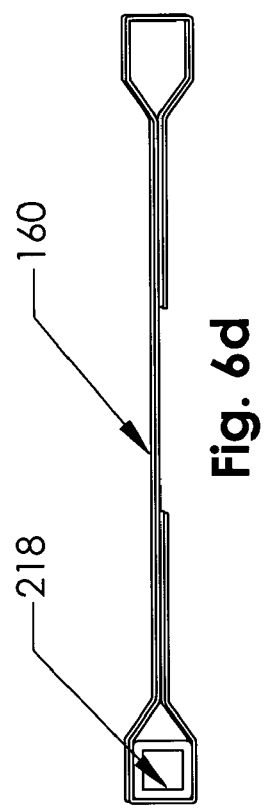

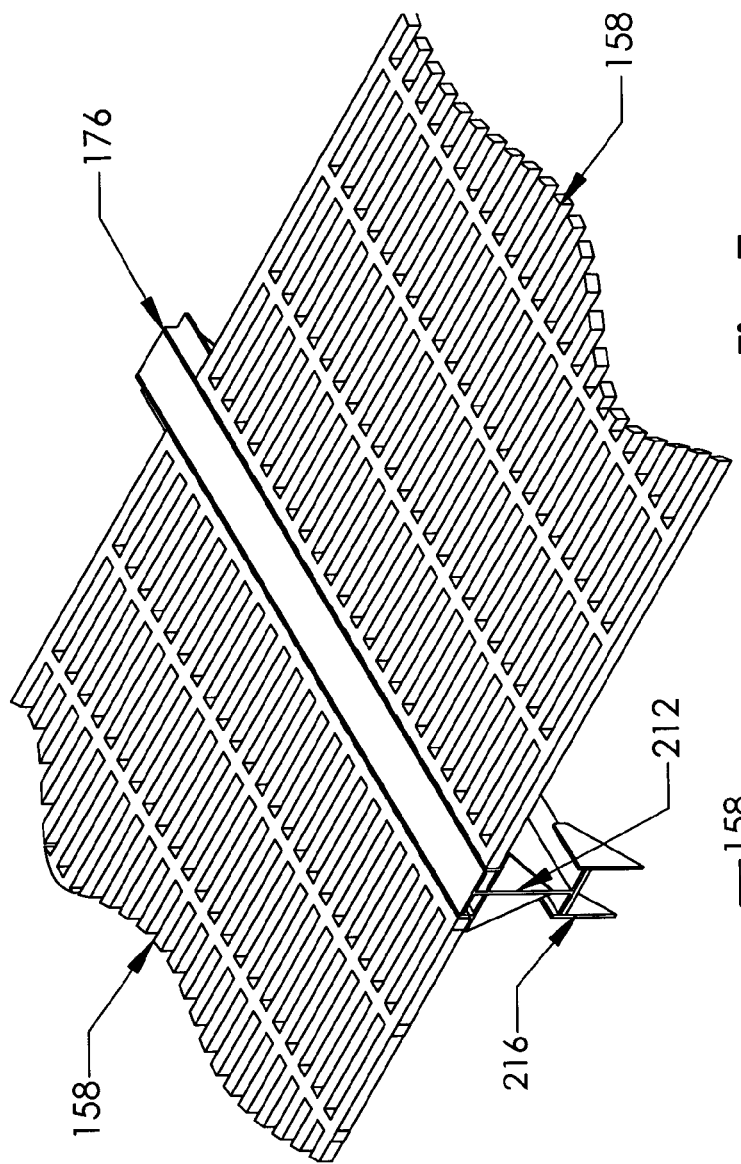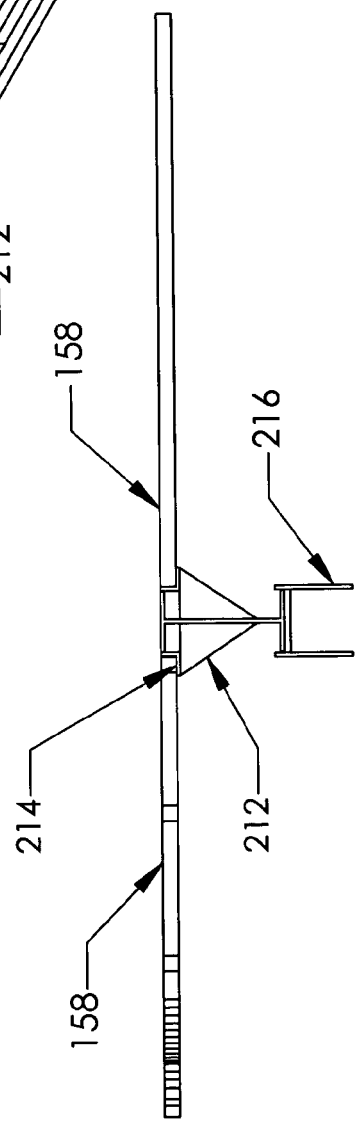
Fig. 7e
Fig. 7d

MODULAR HUMAN HABITAT SIMULATOR

BACKGROUND OF THE INVENTION

1. Field of the Invention

This invention relates to a modular human habitat simulator for use on Earth to provide an environment that approximates, in a controlled test situation, a number of conditions expected to exist when an inflatable modular human habitat is deployed into Earth orbit.

2. Description of the Prior Art

Simulators serve the function of providing an environment that approximates, in a test situation, phenomena and/or conditions likely to occur in actual performance of the apparatus being simulated. Naturally, the apparatus being simulated can be based on a counterpart such as cockpit for an aircraft or a spacecraft, or an object that has no counterpart such as a fantasy amusement park ride.

As to amusement rides, these simulators can provide visual presentations and motion as illustrated by U.S. Pat. No. 5,791,903 to Feuer, et al and U.S. Pat. No. 5,453,011 to Feuer, et al. In this application, the simulator can provide the passenger with the feeling of motion such as angular rotation about a roll axis and limited angular rotation about a pitch axis. Further, visual simulation can be incorporated to enhance the effect of movement.

Simulators for aircraft and spacecraft are also well known as typified in U.S. Pat. No. 4,347,055 to Geiger, U.S. Pat. No. 4,678,438 to Vykukal, and U.S. Pat. No. 5,616,030 to Watson. In these applications, effects such as weightlessness and restrictions such as the dimensions of the environment are simulated as close as possible to the actual environment. To further enhance the simulation these simulators typically include instrument readouts to augment the effect of being in an actual aircraft or spacecraft.

Due to the numerous types of aircraft and spacecraft designs, there are a variety of conditions of interest that may be tested by simulators tailored for each individual type of craft. Thus, while it is possible that certain tests can be applied to a multitude of cases, there is no single simulator that can address all the possible environments of the numerous crafts available. Against this backdrop perhaps the greatest variation occurs with regards to the internal dimensions and volume of each potential simulated environment.

Inflatable modular habitats are not new as evidenced by U.S. Pat. No. 6,231,010 to Schneider, et al, and U.S. Pat. No. 6,547,189 to Raboin, et al. Inflatable modular human habitats have been proposed as a more cost effective way to deploy a space station. This is primarily driven by two factors.

First, the modular habitat has an inflatable shell and thus does not weigh as much as a structure that has a rigid shell. This is important considering the present high cost for placing an object into space. Currently, this cost is of the order of $10,000.00 per pound to place an object into Earth orbit. As a result, the inflatable modular habitat is less expensive to deploy into orbit.

Second, a rigid shell structure has a volume that is the same on Earth as in space. The modular habitat expands in space and thus offers the opportunity for a larger internal volume while in orbit. This increased volume is desirable to house more crewmembers and equipment.

While inflatable modular habitats are well known, there is a need for an inflatable modular habitat simulator that serves the function of providing an environment that approximates, in a controlled test situation, a number of conditions expected to exist when the module is deployed into Earth orbit or space. Situations can be addressed that concern, for example, the placement of equipment, sleeping quarters, location and testing of life support systems, placement of various cylinders inside and outside of the module, lighting, and location of floor structures. These considerations coupled with others, such as, amount, location, and capacity of gas, liquid and power lines would allow crews and systems engineers to better understand how best to utilize the resources and room within the module long before it is in orbit. What is needed is a simulator that reproduces a variety of conditions in a test environment on Earth, including the internal dimensions and volume of a deployed inflatable modular human habitat, that the habitat is likely to experience in space.

BRIEF SUMMARY OF THE INVENTION

This invention is directed to a modular human habitat simulator having a housing with a rigid wall defining an internal volume, a longitudinal axis, a first and second opposing openings along the longitudinal axis, the rigid wall having an exterior surface generally the shape of an exterior surface of a deployed inflatable shell of a modular human habitat, the rigid wall having an interior surface of generally the shape of an interior surface of a deployed inflatable shell of a modular human habitat, and the internal volume being substantially that of a deployed inflatable modular human habitat volume. There is a first distal enclosure, having a passage therethrough, connected to the housing such that the passage aligns with the first opening of the housing, and a second distal enclosure connected to the housing such that a passageway exists into the second opening of the housing. Also, there is at least one longeron fixedly attached to, and extending from, the first distal enclosure through the internal volume and fixedly attached to the second distal enclosure.

BRIEF DESCRIPTION OF THE SEVERAL VIEWS OF THE DRAWINGS

FIG. 3 is a partial cut-away isometric view of a deployed inflatable modular human habitat identifying the shape of the habitat shell;

FIG. 3a is another partial cut-away isometric view of a deployed inflatable modular human habitat identifying a second type of shape of the habitat shell;

FIG. 4 is a partial cut-away isometric view of a modular human habitat simulator;

FIG. 4a is another partial cut-away isometric view of a modular human habitat simulator identifying the debris shield and location of storage and cylinders;

FIG. 6d is a cut-away side view of a strap and tension bars;

FIG. 6e is a side view of a tension bar;

FIG. 7d is a cross sectional side view of a support beam;

FIG. 7e is an isometric view of a segment of the floor structure;

DETAILED DESCRIPTION OF THE INVENTION

Figure 1:
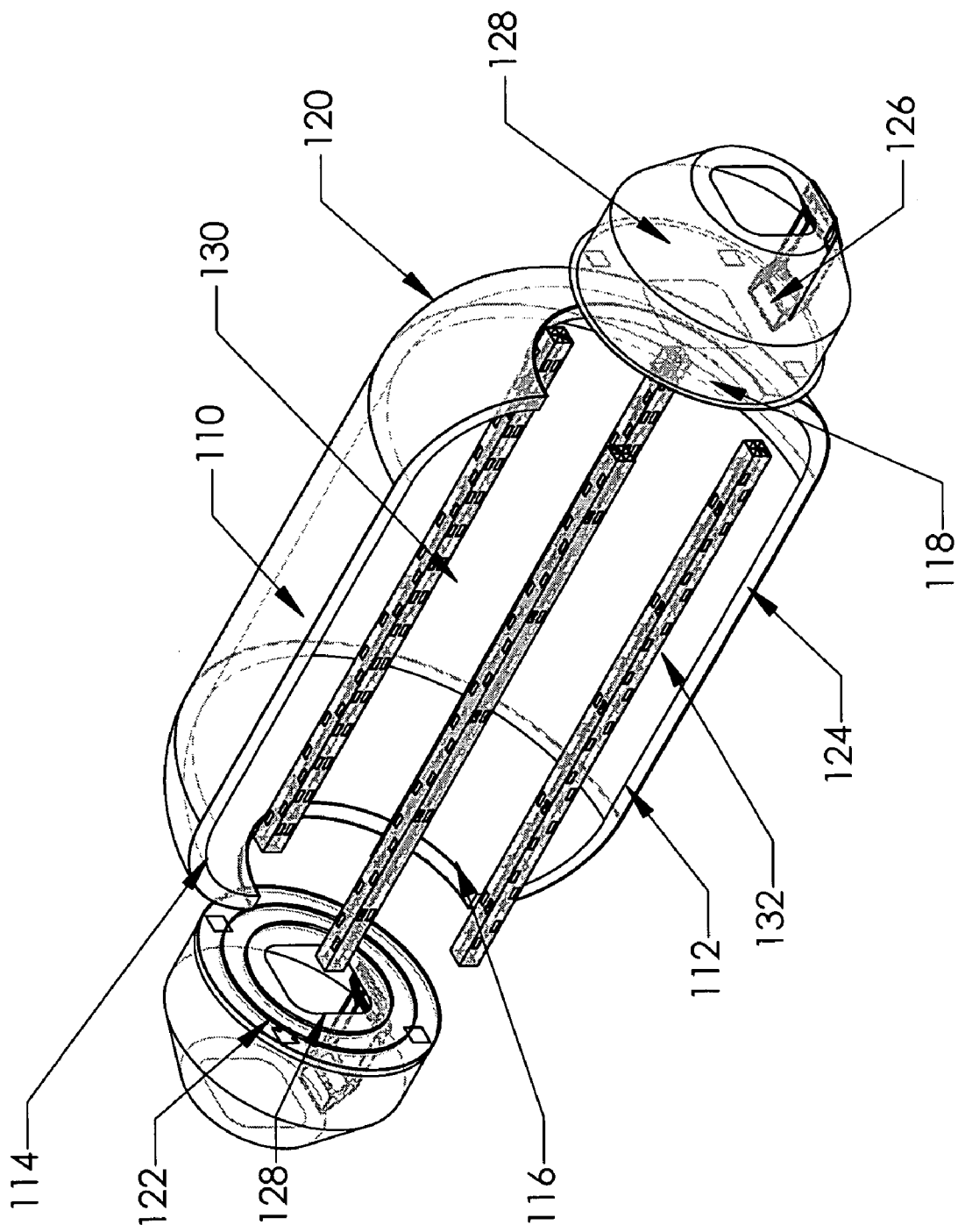
FIG. 1 is a partial cut-away isometric view of the modular human habitat simulator with the opposing distal ends not attached to the housing.

The present invention may best be understood by reference to the following description taken in conjunction with the accompanying drawings. FIG. 1 is a partial cut-away isometric view of the modular human habitat simulator 110. The modular human habitat simulator 110 is comprised of a housing 112 that has a rigid wall 114 defining an internal volume 130, a first opening 116 and a second opening 118, and an external surface 120 and an interior surface 124. The housing 112 provides, for example, shelter for a crew, an enclosure for storage of materials and/or equipment, and an enclosed area for containing equipment. Along with the housing 112, there is a first distal enclosure 122 having a passage 128 extending through the enclosure, and a second distal enclosure 126. At least one longeron 132 is identified, however the modular human habitat simulator 110 does not require a fully functional longeron 132 as would be employed in a deployed modular habitat. These longerons 132 can be fully functional, partially functional, or non-functional and thus merely incorporated to indicate the existence of a longeron in the simulator. In the preferred embodiment, there are four longerons 132 and each longeron is at least partially functional. That is, each longeron has a degree of structural integrity that allows it to assist in supporting a floor.

The distal enclosures are hollow and can be used as a simulated airlock to another craft, a passage 128 into the internal volume 130, and/or storage. The rigid wall 114 can be of any rigid material including metal, metal composite, or other type of non-metal rigid matter. In the preferred embodiment, the rigid wall 114, and the first distal enclosure 122 and the second distal enclosure 126 are made of steel. In an alternative embodiment, the wall may also be a substantially rigid wall where the wall exhibits some degree of flexibility. In such a case, the substantially rigid wall may be of a composite material or an alloy that allows for a certain amount of movement.

Figure 2:
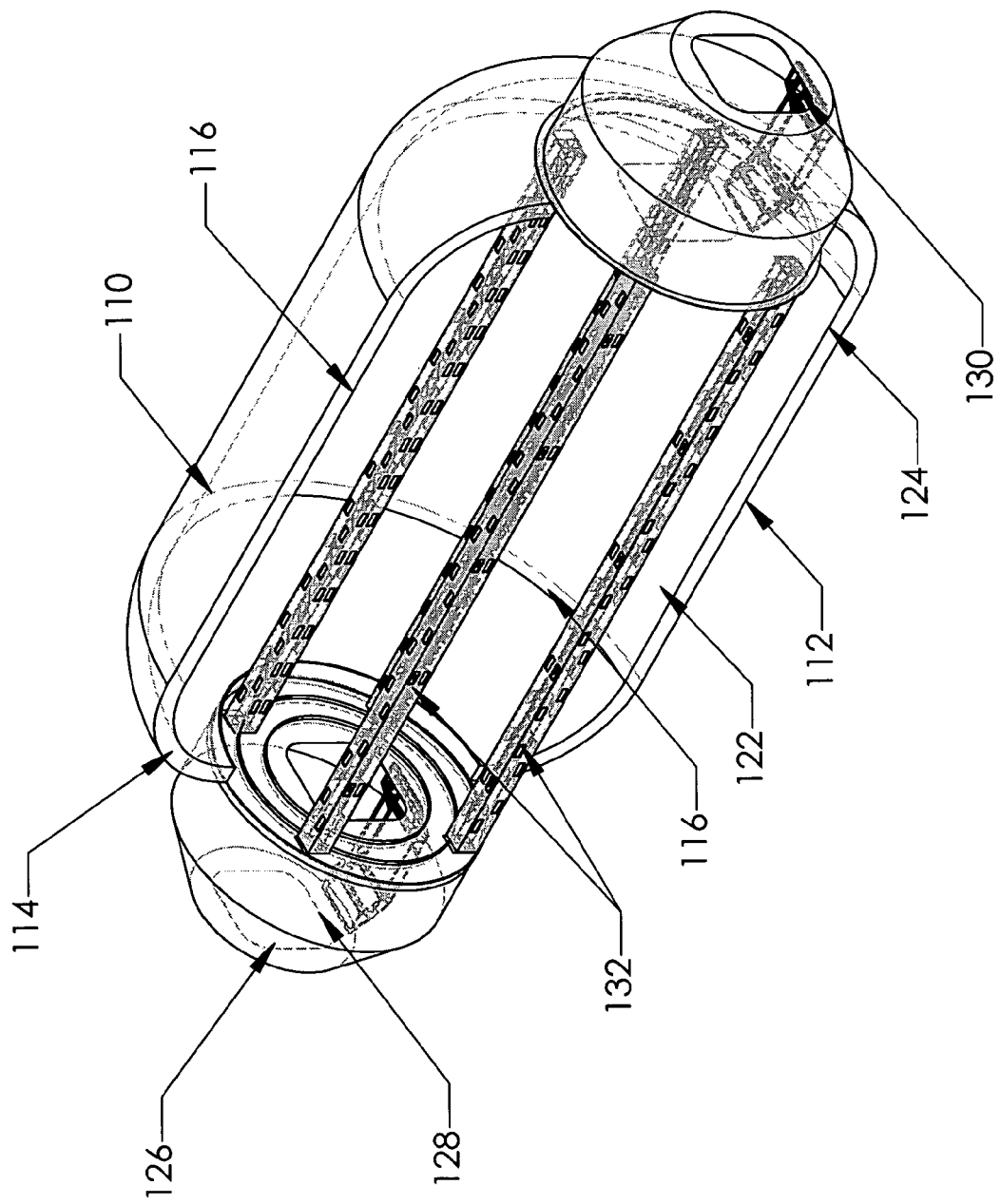
FIG. 2 is a partial cut-away isometric view of the modular human habitat simulator with the opposing distal ends attached to the housing.

Turning now to FIG. 2, the elements of the modular human habitat simulator 110 are assembled showing how access to the internal volume 130 is achieved through the passage 128 in the first distal enclosure 122. The passage 128 runs through the first distal enclosure 122 between the opening 180. In this figure, there are two longerons 132 that serve to connect the first distal enclosure 122 and the second distal enclosure 126. However, any number of longerons 132 may be used as is required by the given situation. Furthermore, the shape of the interior surface 124 and external surface 120 in FIGS. 1 and 2 is not restricted to that displayed in the figures as will be discussed.

The first distal enclosure 122 and second distal enclosure 126 are connected to the housing 112 by known conventional means. In the preferred embodiment, the distal enclosures are made of steel and connection is accomplished by welding the first distal enclosure 122 and the second distal enclosure 126 to the housing 112.

Figure 3B:
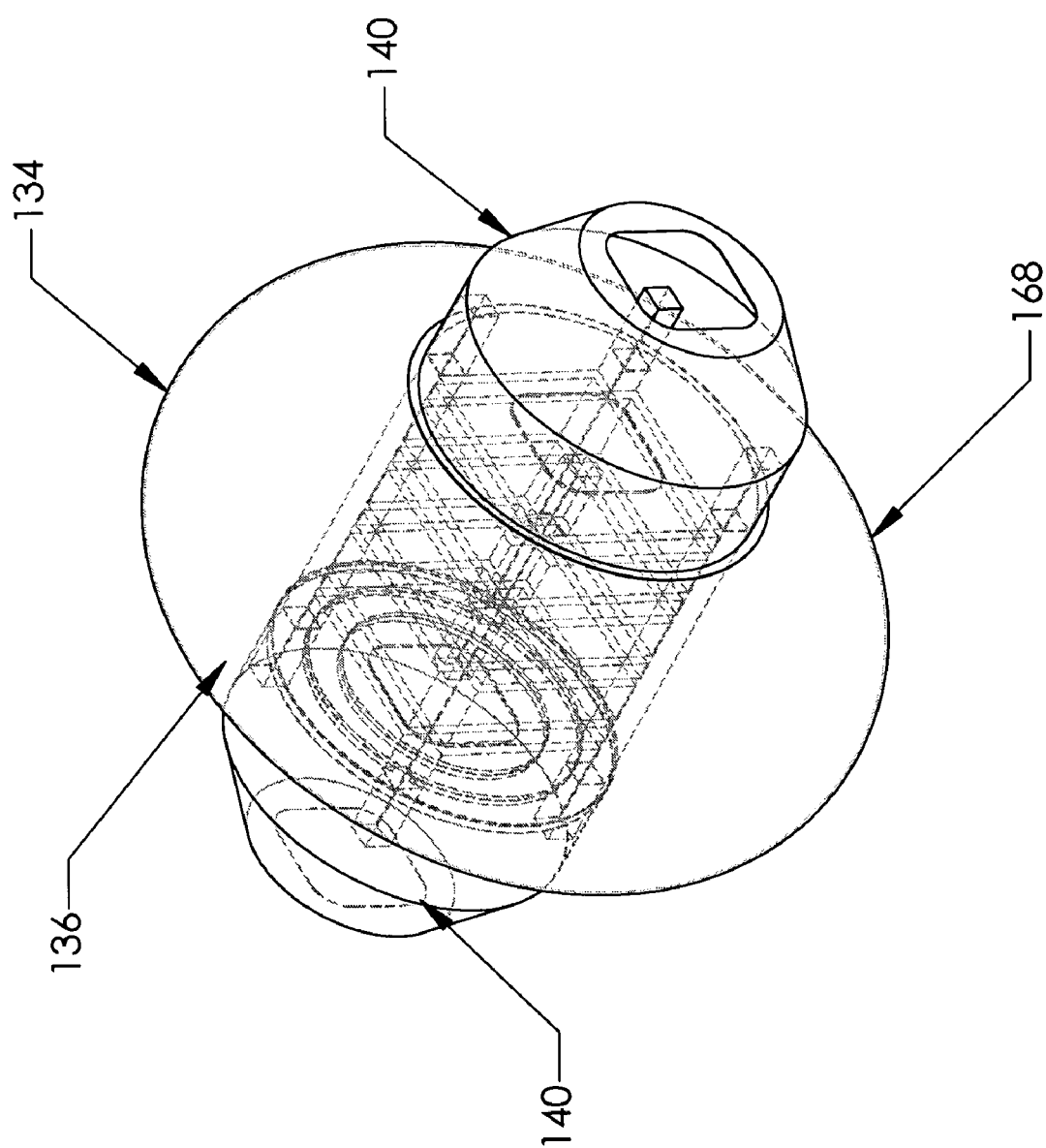
FIG. 3b is another partial cut-away isometric view of a deployed inflatable modular human habitat identifying a third type of shape of the habitat shell.

Referring to FIG. 3, a cross-sectional view of a modular habitat 134 as would be deployed in space is shown. The shape of the deployed modular habitat is substantially different than from the shape of a non-deployed modular habitat. In the non-deployed state, the modular habitat is compressed to fit within a casing on a rocket or within a shuttle. Once deployed, the modular habitat is inflated into a deployed shape. The shape of the deployed inflatable shell 136 bulges out and substantially around the distal enclosures 140. In FIG. 3a, the deployed inflatable shell 136 has a shape different than that in FIG. 3. The shape of the deployed inflatable shell 136 in FIG. 3a does not tend to wrap around the distal enclosures 140. As FIG. 3b shows, the shape of the deployed inflatable shell 136 has more of a bulge toward the center of the deployed inflatable shell 136 than in either FIG. 3 or FIG. 3a. FIGS. 3, 3a, and 3b are representative of wide variety of shapes that a deployed inflatable shell 136 can assume depending upon the choice of variables such as the size of the deployed inflatable shell 136 and longitudinal length between the distal enclosures 140. It naturally follows, that the shape of the deployed inflatable shell internal surface 168 is thus driven by the parameters that dictate the overall shape of the deployed inflatable shell 136.

Figure 10:
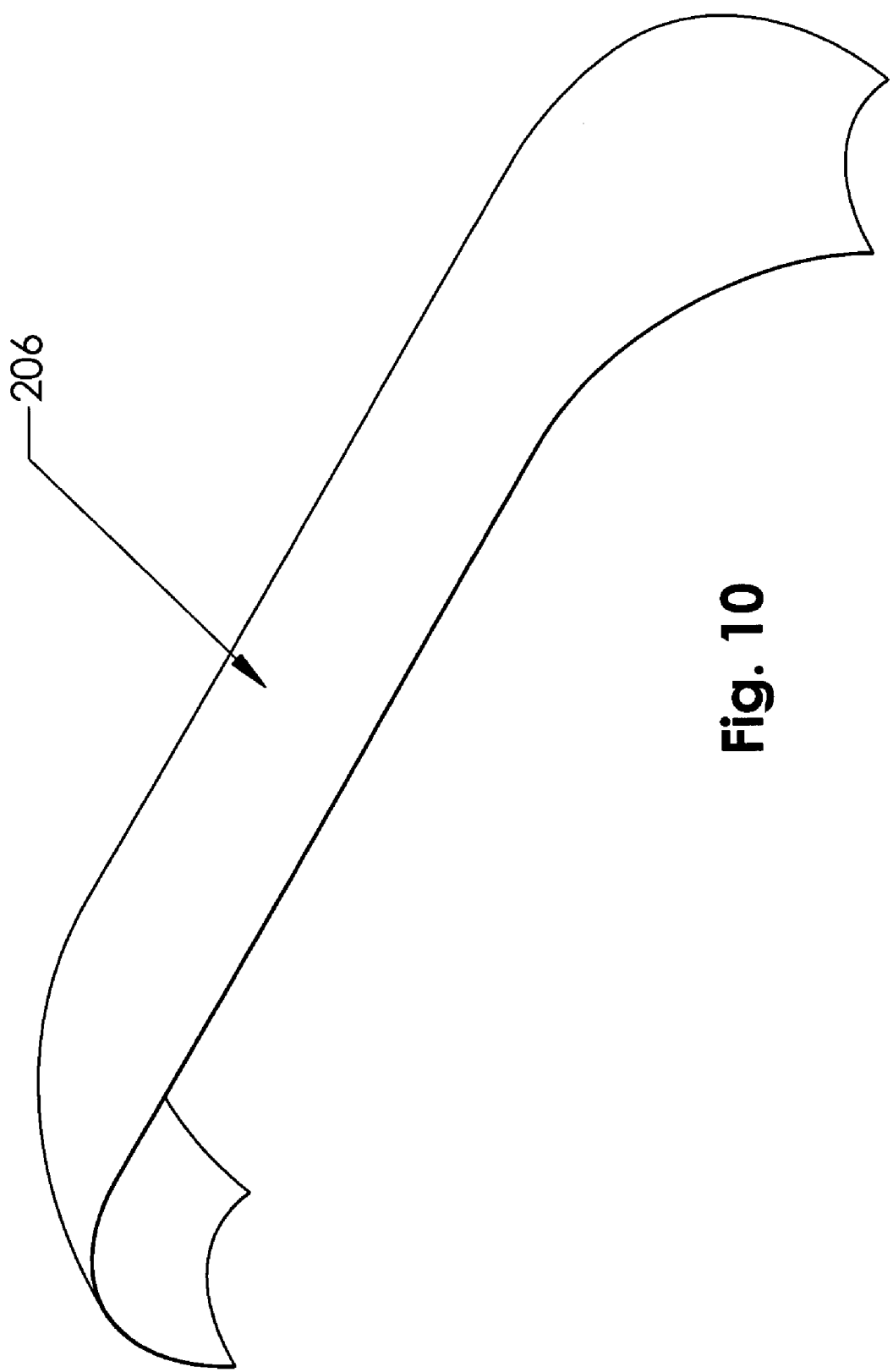
FIG. 10 is a isometric view of a housing segment.

As FIGS. 3, 3a, and 3b indicate, the shape of a modular habitat 134 deployed inflatable shell 136 is not restricted to a single profile. As a result, in referencing FIGS. 1 and 2, the shape of the interior surface 124 of the modular human habitat simulator will be dependent upon the anticipated shape of a deployed inflatable shell of a modular habitat, and in particular the anticipated resulting shape of a particular deployed inflatable shell internal surface 168 as exemplified in FIGS. 3, 3a, and 3b. This is the reason that the interior surface is generally the shape of the deployed inflatable shell internal surface of a specific modular habitat. Furthermore, as there are a variety of shapes available, the internal volume 130 identified in FIGS. 1 and 2 would be substantially the internal volume of a deployed inflatable modular human habitat. Naturally it follows that the internal volume of the simulator will be dependent upon a number of factors characteristic of a particular deployed module such as the longitudinal length of the module and the shape of the shell of a deployed inflatable modular human habitat. As illustrated, there are two circumferential strap assemblies. Again, they are referred to as the first and second circumferential strap assemblies. FIG. 10 illustrates how the zipper would engage and thereby fasten the circumferential strap assemblies 138 to the radial strap assembly 144. Turning now to FIG. 14, the tape 126 is sewn 146 to a strap 106. When the zipper teeth 130 are engaged, the straps 106 overlap 148. This overlap helps to insure that the bladder 150 is not pinched or cut by the zipper. In an alternate embodiment, the straps do not overlap, but rather meet side by side to protect the bladder from the zipper.

Addressing now FIG. 15, the flexible restraint layer 146 covers the bladder 150. The restraint layer 146 and the bladder 150 are securely fastened to the fore 152 an aft 154 assemblies while the longerons 156 separate the fore and aft assemblies. Fastening of the bladder to the fore and aft assemblies is accomplished by known means such as the use of end rings and/or attachment rings. The fore and aft assemblies and the longeron compose the rigid structural core. In the preferred embodiment, there are four longerons 156, the fore assembly 152 is an airlock that is adapted to hold the strap loops 112 securely in place by known conventional means such as the use of rollers or a bar, and the aft assembly 154 is used primarily for storage, but also has the same means for securing the strap loops 112. Also, the fore and aft assemblies are adapted to secure the bladder in place. In an alternative embodiment, the aft assembly 154 may also be an airlock. Further, in the preferred embodiment, the fore and aft assemblies are made of steel. In the case where the longerons are made of steel securing is accomplished by use of techniques such as welding or nuts and bolts.

FIG. 4 also depicts a portion of a simulated debris shield 144. A fully deployed modular habitat would, typically, have a debris shield covering the majority of the outside perimeter. This shield is a protective barrier against impacts from particles or penetration by radiation. In the modular human habitat simulator 110, only a portion of the debris shield is identified as being fixedly attached to the external surface 120 and this portion may or may not be functional as the case dictates. The portion of the simulated debris shield is fixedly attached by conventional methods including, but not limited to, the use of adhesives, restraints such as rope and hooks, fasteners, bolts and screws, snap-tight locking devices, or hooks and eyeholes.

In FIG. 4a, a number of cylinders 154 are placed within the first distal enclosure 122, second distal enclosure 126, and internal volume 130 of the housing 112. The cylinders 154 simulate the storage requirements of gases and liquids during deployment of a modular habitat 134 in space. The number, and location, of the cylinders 154 is dependent upon the mission and experimental scenario.

Figure 5:
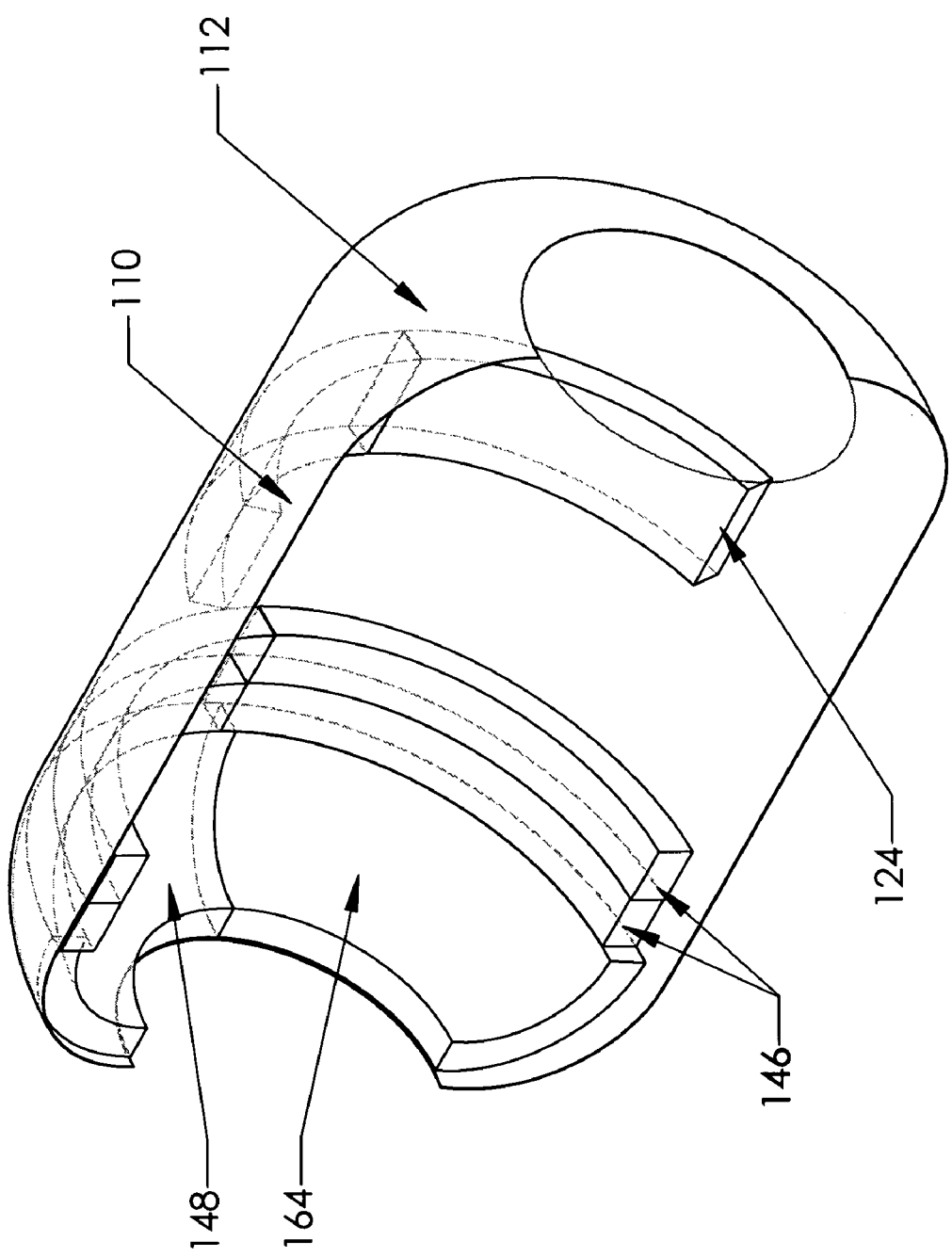
FIG. 5 is a partial cut-away isometric view of a modular human habitat simulator identifying water bags and panels.

When a modular habitat is deployed, there are a number of safety features present for the protection of the crew. One such feature is the use of water to assist in absorbing certain forms of radiation. Turning to FIG. 5, a number of simulated water bags 146 are deployed about the interior surface 124 of the modular human habitat simulator 110. This provides those working within the simulator the opportunity to work in an environment that, in space, would likely have such bags in the deployed modular habitat. The simulated water bags 146 are constructed from materials that are light weight and pliable enough to conform to the geometry of the interior surface 124. In the preferred embodiment, the simulated water bags 146 are made of a substantially pliable foam substance such as polyurethane. The simulated water bags are fixedly attached to the interior surface 124 by any number of means including, but not limited to, adhesives, fasteners such as VELCRO®, rope and hooks, bolts and screws, snap-tight locking devices, or hooks and eyeholes.

Figure 5A:
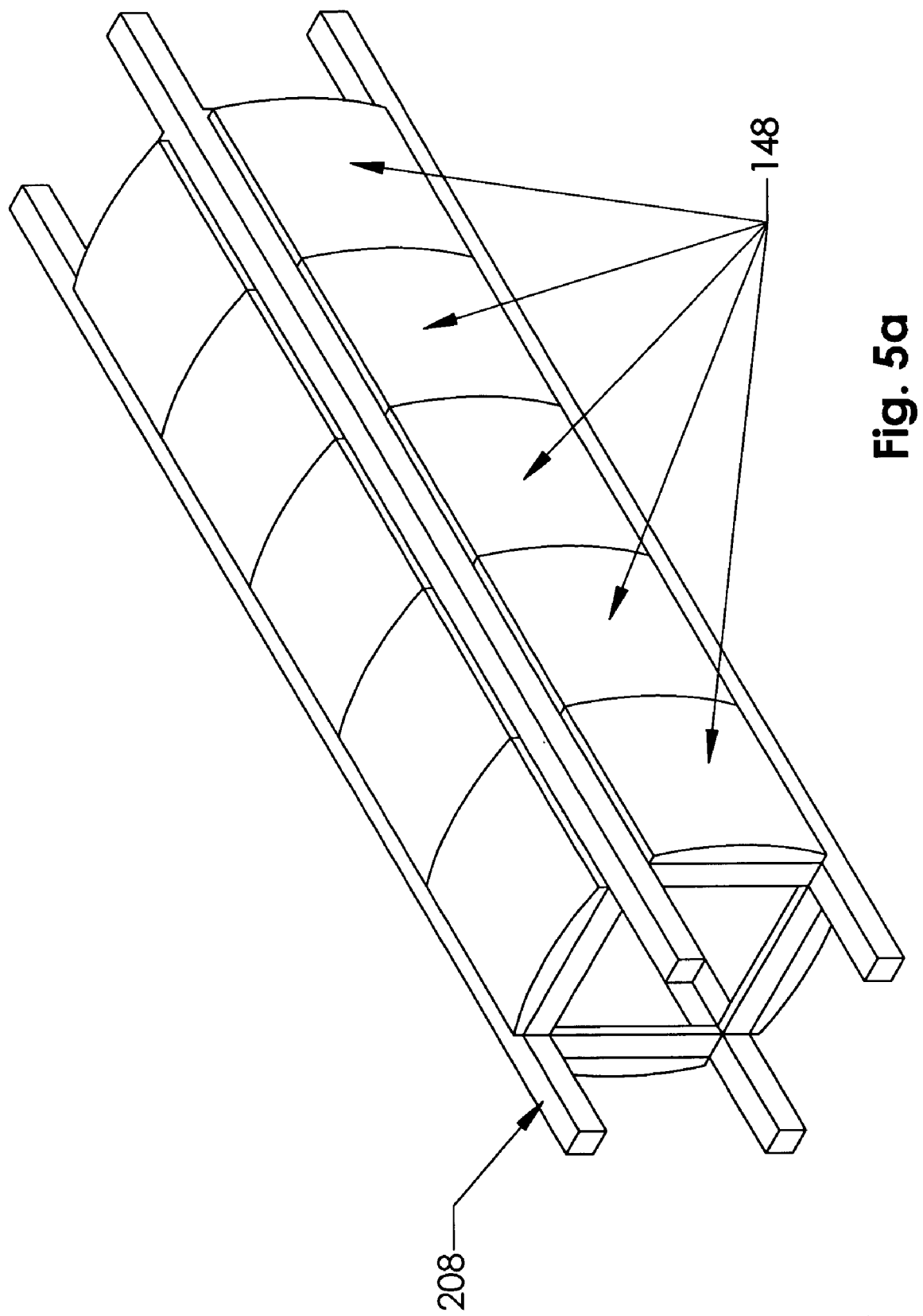
FIG. 5a is an isometric view of a core's longerons with panels.

Another such safety feature is the use of panels. FIG. 5a illustrates how panels 148 are attached to a core 208 in a configuration before launch. The panels 148 serve the function of providing a structure to hold the un-inflated shell of a modular habitat in place during deployment. After deployment, the panels 148 can be re-positioned within the inflated shell. Returning to FIG. 5, the figure shows how the simulated panels 164 are placed about the interior surface 124 of the housing 112. In the preferred embodiment, the simulated panels 164 are also made of a substantially pliable foam substance such as polyurethane. The simulated panels are fixedly attached by the same methods described above for attaching the simulated water bags 146.

Figure 6:
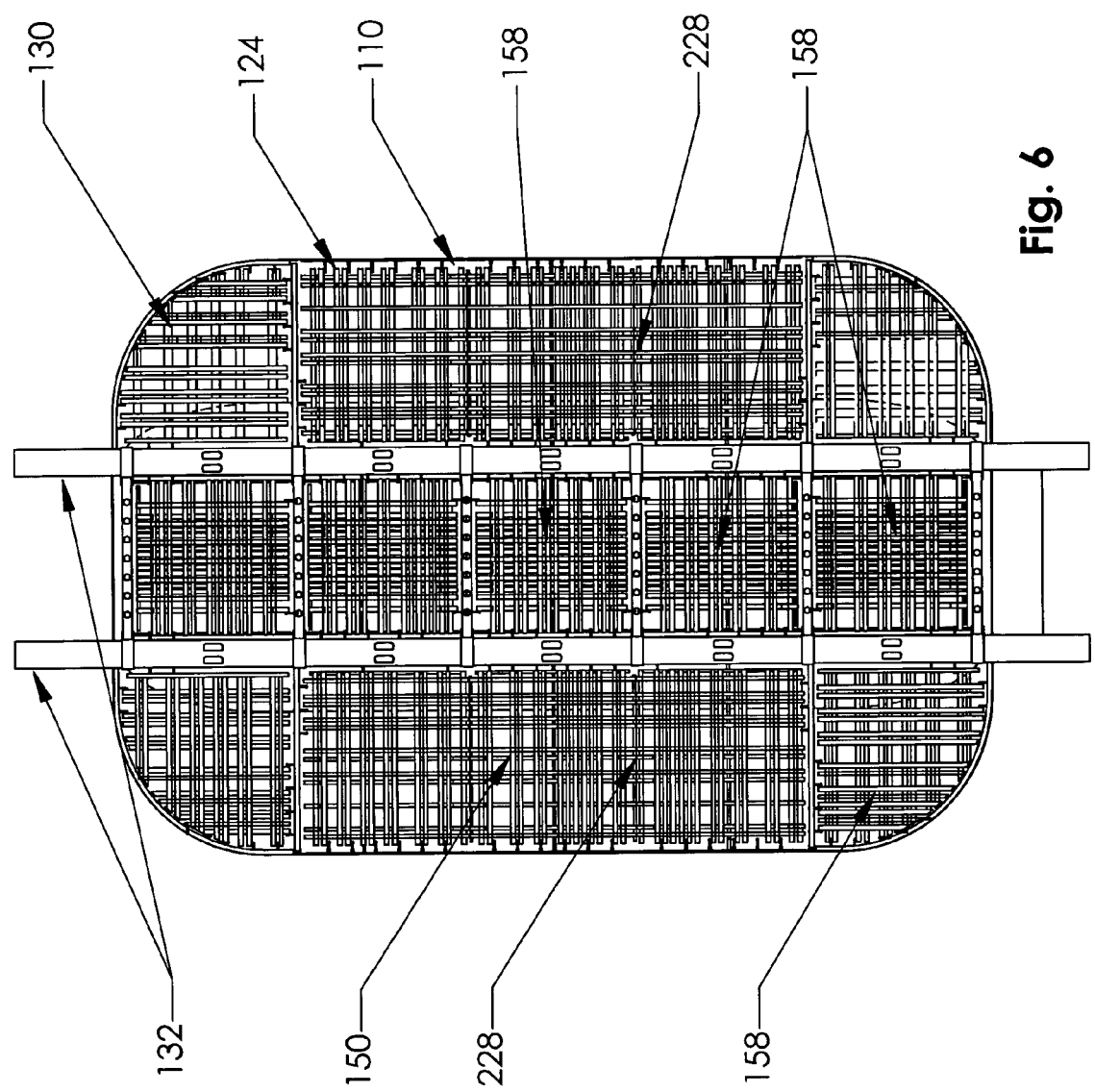
FIG. 6 is a partial cut-away aerial isometric view of a modular human habitat simulator showing a floor structure.
Figure 6A:
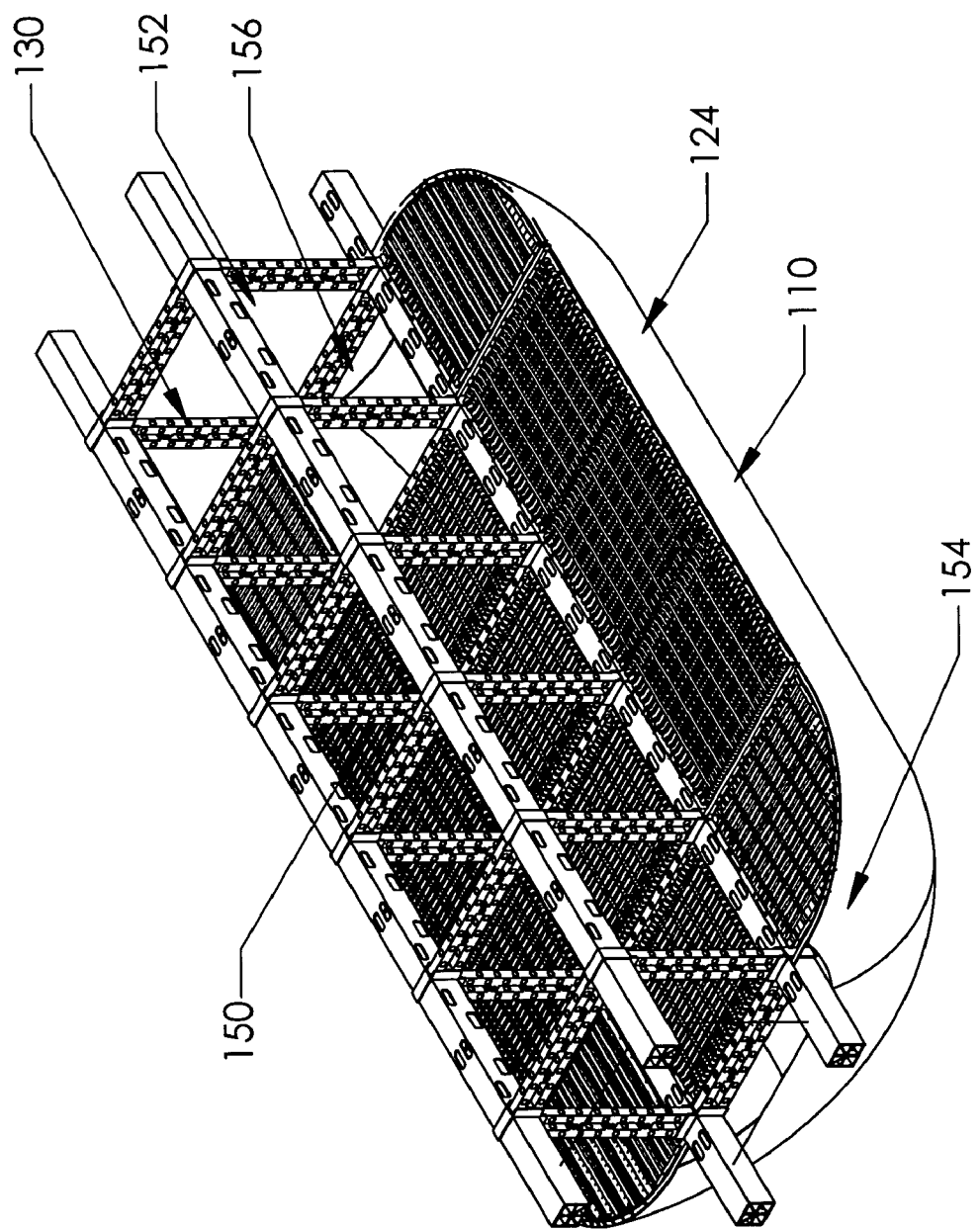
FIG. 6a is a partial cut-away isometric view of a modular human habitat simulator.

Addressing now FIG. 6, there is a floor structure 150 disposed within the internal volume 130 of the modular human habitat simulator 110. Referring to FIG. 6a, the presence of the floor structure 150 divides the internal volume 130 into an upper internal space 152 and a lower internal space 154. In the preferred embodiment there are three floor structures 150 that divide the internal volume 130 into four internal spaces.

FIGS. 6 and 6a also shows the floor structure 150 extending along the longitudinal axis from approximately end to end of the modular human habitat simulator 110. In the preferred embodiment, this is the chosen configuration. By running longitudinally, the crew has a greater degree of depth perception in the modular human habitat simulator 110. This longitudinal arrangement promotes a better psychological environment for the crew and more efficient access to equipment placed on, or within the proximity of, the interior surface 124. Access to different levels of floor structures is accomplished through at least one access opening 156. Conventionally known means, such as but not limited to stairs, ladders, and ropes, are available to transcend to other levels through the access opening.

Figure 6B:
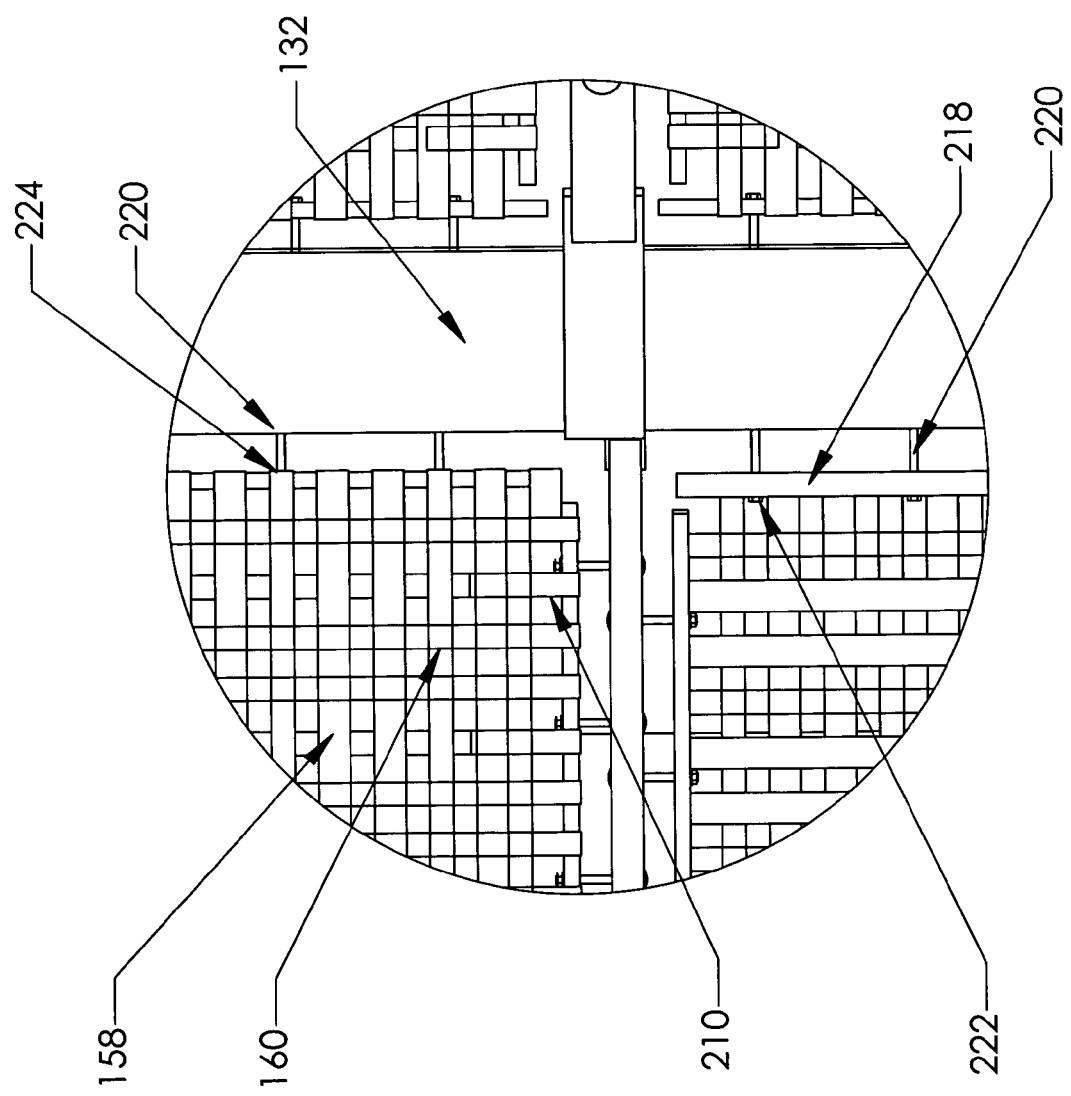
FIG. 6b is a partial view of the floor straps.

The floor structure 150 is comprised of a plurality of floor segments 158 as identified in FIG. 6. Turning to FIG. 6b, in the preferred embodiment each floor segments 158 is made of interlaced flooring straps 210. Each flooring strap 160 runs from one side of the floor segments 158 to the other side. There are a number of ways in which the individual flooring straps can be interlaced to form each floor segments as would be apparent to those of ordinary skill in the art. By removing a floor segment 158, an access opening 156 can be created for the crew to transcend from one level to another.

Figure 6C:
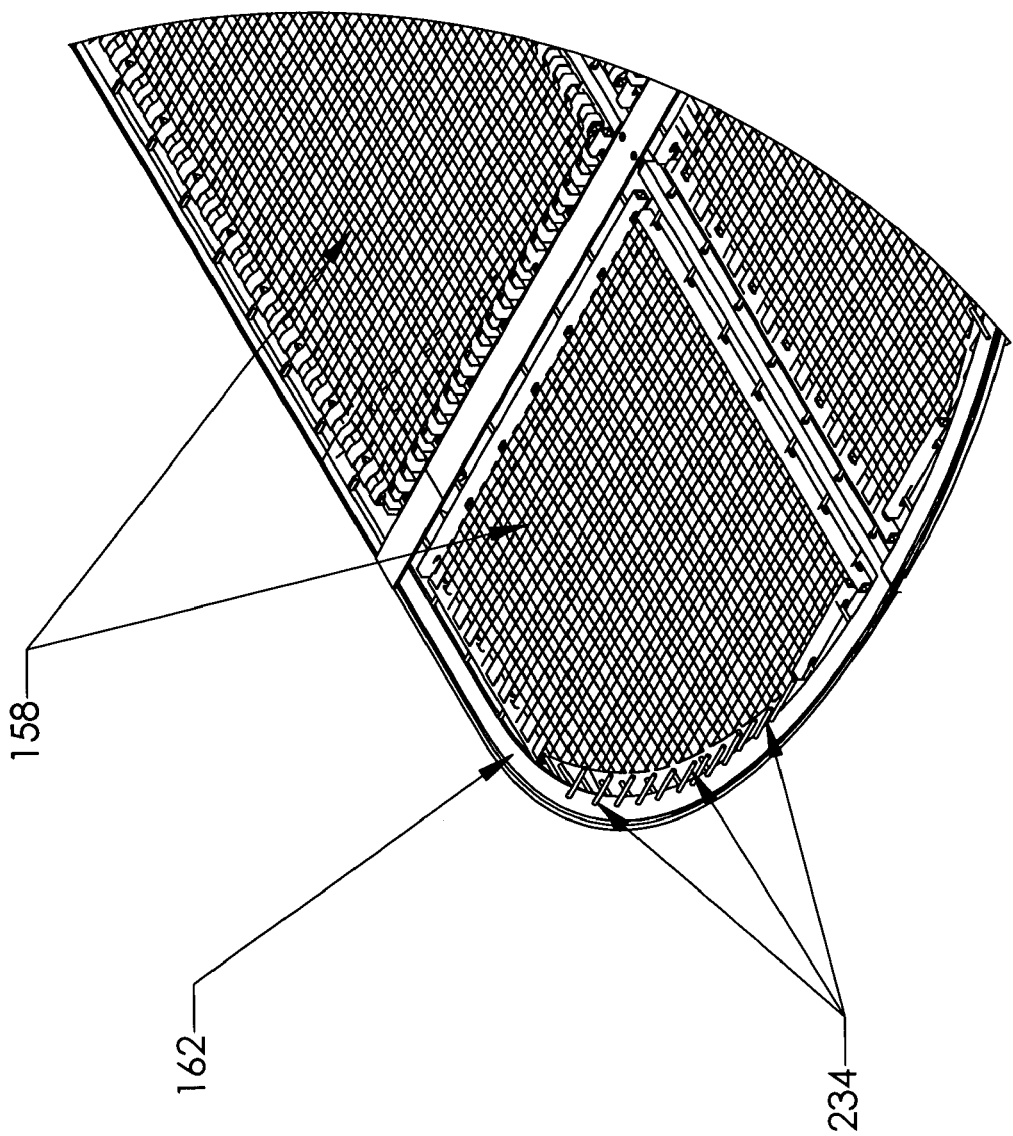
FIG. 6c is a partial view of a rounded floor strap assembly.

In the case of FIG. 6c, where there is a rounded side 162, certain of the flooring straps 160 terminate on posts 234 on the rounded side 162. FIGS. 6d and 6e identifies how the straps 160 wrap around the tension bar 218, which is similar to the wrap around the posts in FIGS. 6d and 6e.

Returning now to FIG. 6b, the tension bars 218 provide the primary support for the interlaced flooring straps 210 and forms at least one side of the floor segments 158. As shown in FIGS. 6d and 6e, each flooring strap 160 end that attaches to a tension bar 218 does so by wrapping around the tension bar. Focusing again on FIG. 6b, each tension bar 218 has a plurality of holes 224. The holes 224 are aligned with a number of bolts 220 that are secured in place along the any number of structures including, but not limited to, a longeron 132, support beam, or a secondary bar. In the case of a secondary bar, the secondary bar is secured in place by being attached to, for example, a longeron 132, the interior surface 124 of the housing 112, or a support beam 176. Attachment of the secondary bar is accomplished in a number of ways including, but not limited to, welding.

In proceeding to secure each floor segments 158, the bolts 220 fit through the holes 224 of the tension bars 218. Once the bolts are inserted, nuts 222 are applied to the bolts 220. As the tension bars 218 are secured in place by tightening the nuts 222, the interlaced flooring straps 210 are tightened and become taut or semi-taut. This taut or semi-taut condition provides support for a person to walk on the interlaced flooring straps 210.

Returning to FIG. 6, adjacent floor segments 158 that are not bordered entirely by the tension bar are held together by conventional connection means such as carabiners 228, being tied together by rope or cord, or other such means. This is the preferred embodiment for adjacent floor segments 158 that do not utilize tension bars 218.

In a deployed module, the floor structure 150 might not be of the form of a taut or semi-taut flexible webbing or solid material. This is because the low gravity environment anticipated for the deployed module does not necessarily require a floor structure to be solid as would be the case on the surface of the Earth. The floor structure in the modular human habitat simulator is subject to Earth's gravity and thus a floor is needed that can support a persons' weight. Thus, flexible materials can be used, as in the case of taut interlaced flooring straps, for the floor structure.

Depending upon the type of experimentation conducted within the modular human habitat simulator, it may be desirable to use a flexible and non-rigid floor structure. In another embodiment, the floor segments are made of a metal or metal composite or alloy. The floor segments can be solid or perforated with holes to reduce weight. Other materials having a flexible yet sturdy characteristic such as graphite composites may also be used as dictated by the desired environment. By removing a floor segments an access opening can be provided for a crewmember to transition between the different levels within the housing created by the various floor structure in the same way as for the strap based floor structure discussed above.

Figure 7:
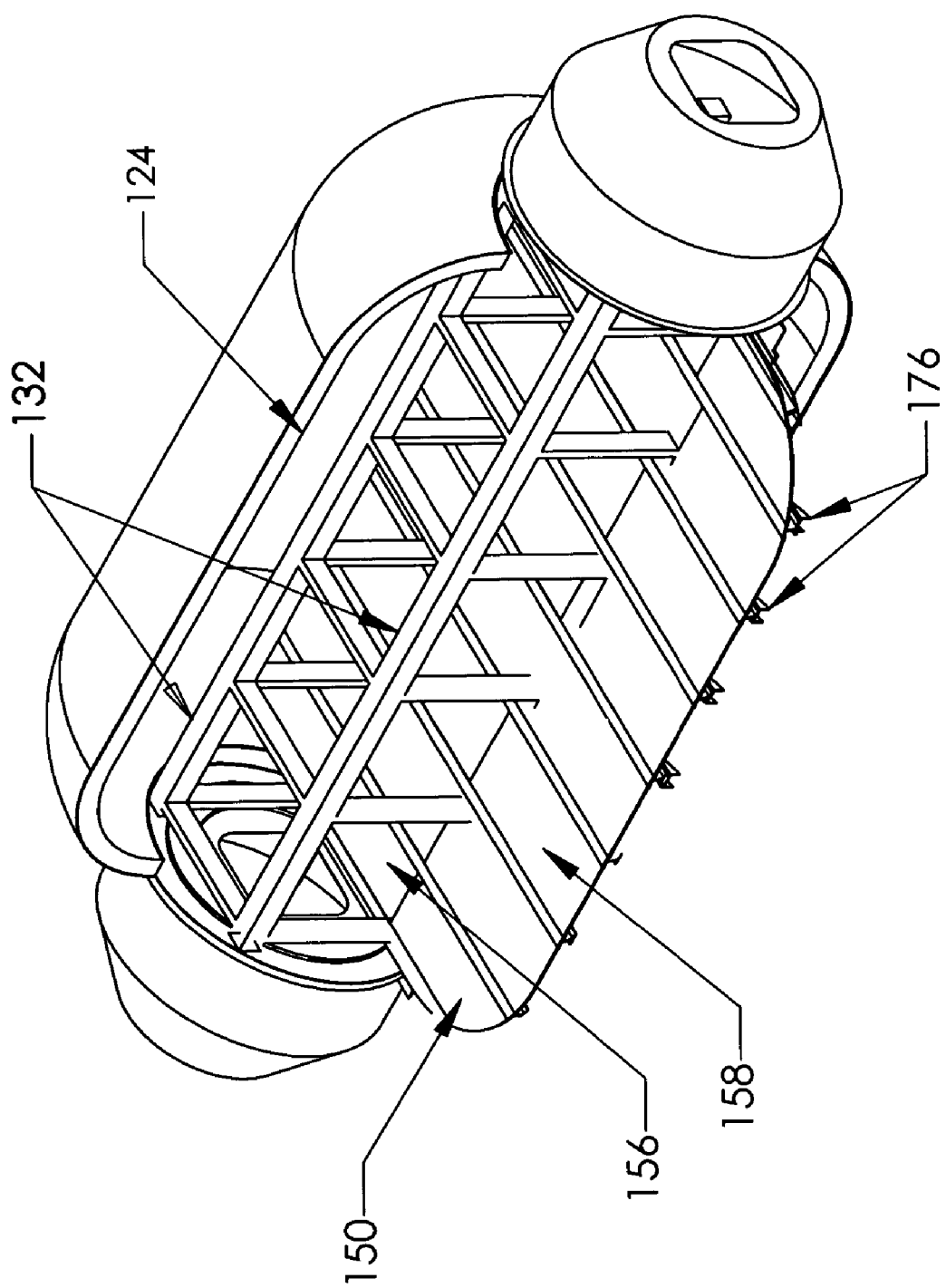
FIG. 7 is another partial cut-away isometric view of a modular human habitat simulator identifying the floor structure.

Turning now to FIG. 7, the floor structure 150 is rigid or substantially rigid and composed of a metal or metal alloy. Again, a floor segments 158 can be removed to provide an access opening 156 to another level within the housing 112. The floor segments 158 are supported in place by the longerons 132 and support beams 176. In an alternative embodiment, the modular human habitat simulator 110 does not incorporate any longerons, in which case the floor segments 158 are supported by the support beam 176.

Figure 7A:
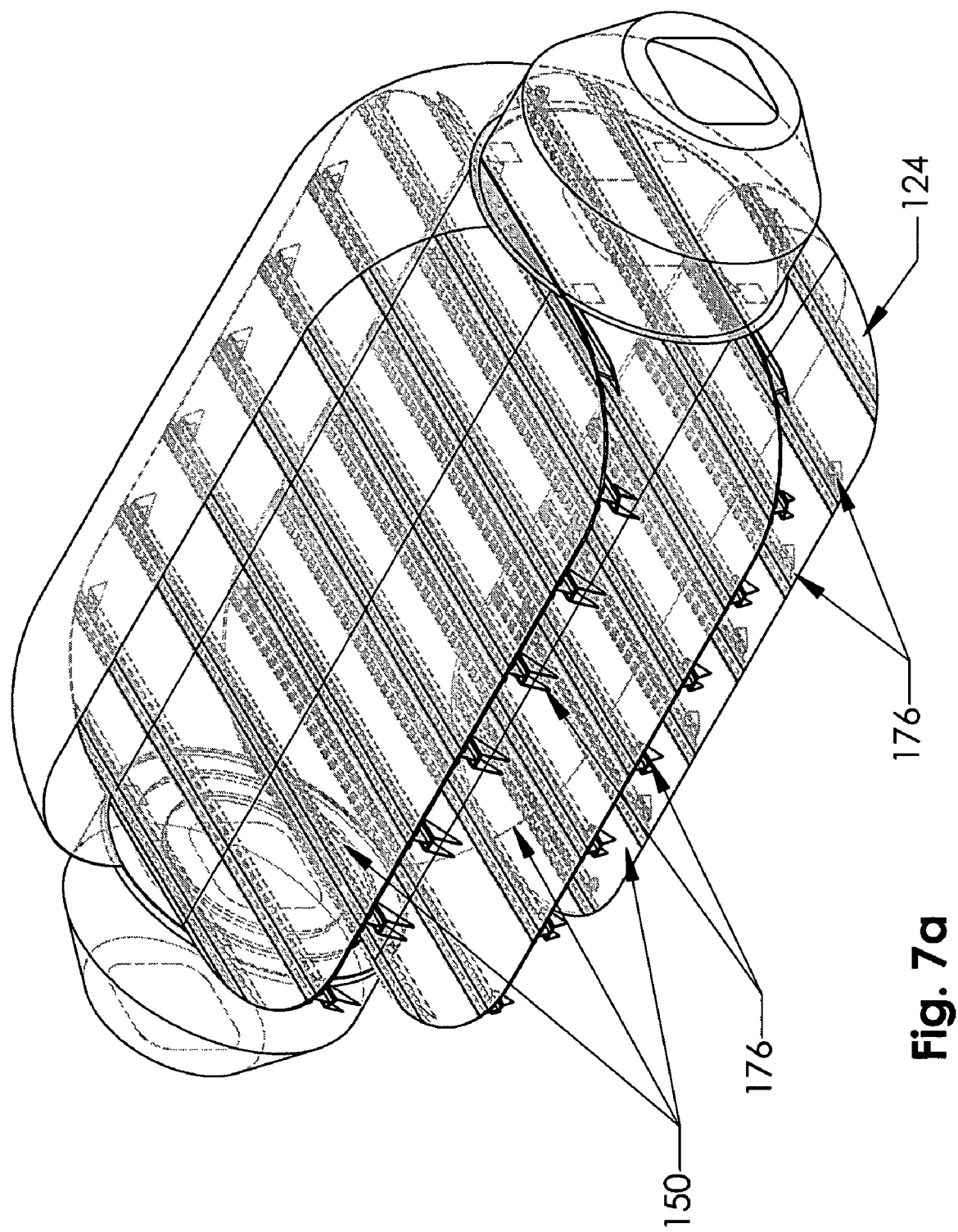
FIG. 7a is a partial cut-away isometric view of a modular human habitat simulator showing multiple floor structures.

Addressing now FIG. 7a, three levels of floor structures 150 are used in the modular human habitat simulator 110. The lowest level floor structure is supported primarily by support beam 176 attached to the bottom of the interior surface 124.

Figure 7B:
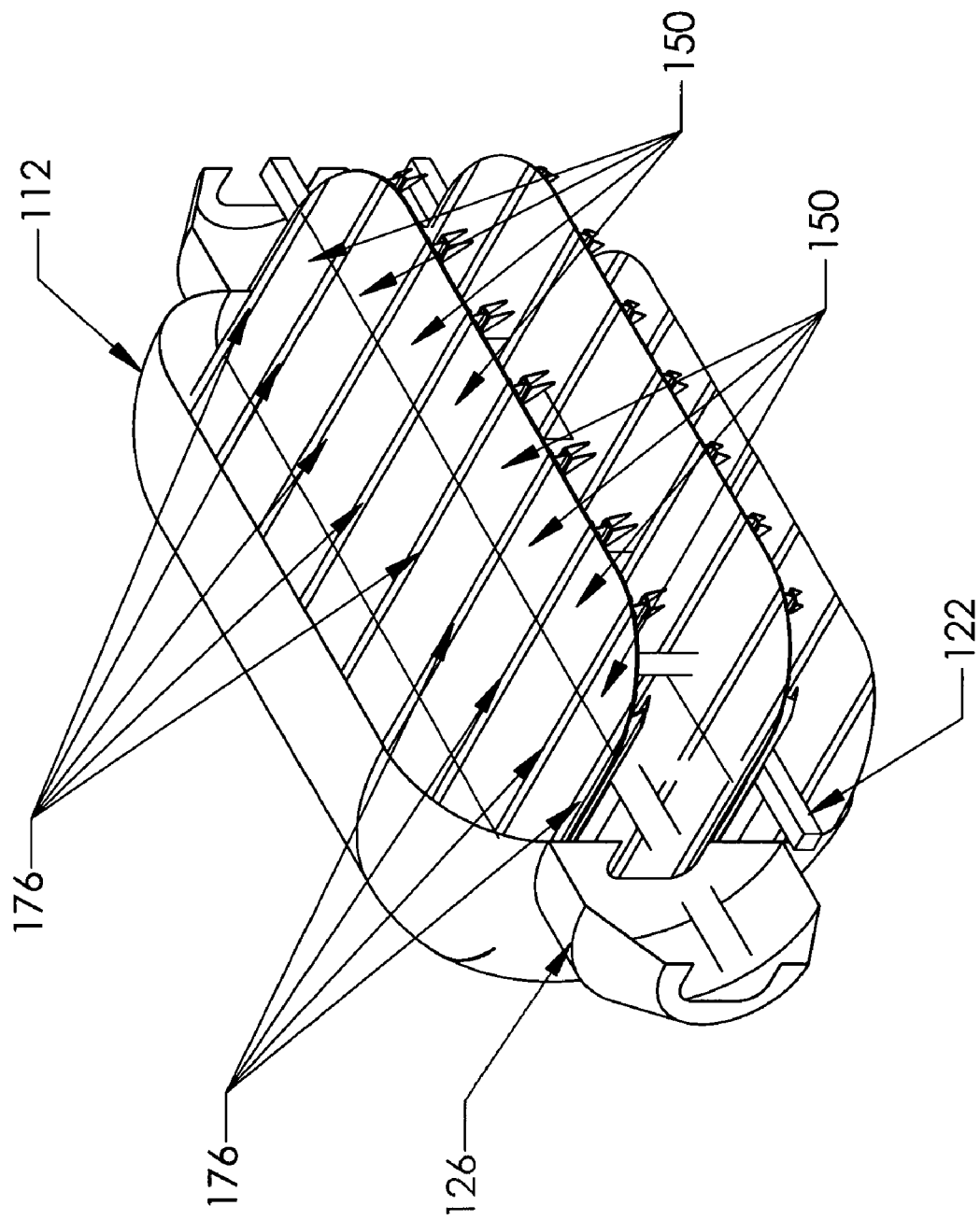
FIG. 7b is a partial cut-away aerial isometric view of a modular human habitat simulator showing support for a floor structure.
Figure 7C:
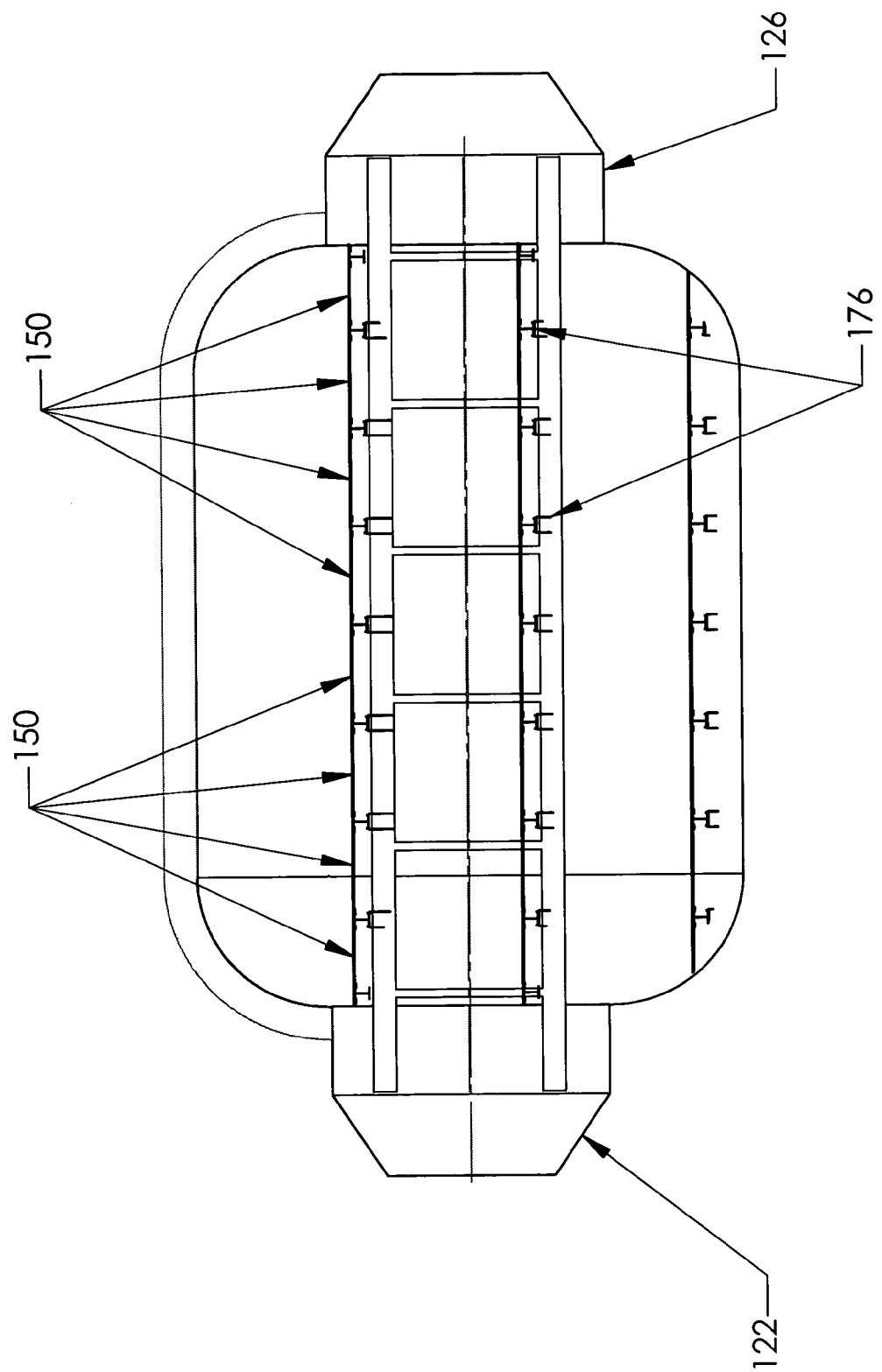
FIG. 7c is a cross sectional side view of a modular human habitat simulator showing a floor structure in relation to the longerons.

Addressing now FIG. 7b, a plurality of floor structures 150 are viewed from an aerial perspective. The floor structure 150 is supported by a number of support beams 176 that span the approximate inside diameter of the housing 112. As shown in FIG. 7c, the support beams 176 are under the floor structure 150 and keep the floor structures 150 in place.

FIG. 7d is a cross-sectional view of the support beam 176. The support beam 176 is substantially in the form of an "I" beam. A support plate 212 is attached to the "I" shaped support beam 176. The support plate 212 holds an angled floor support 214, which runs the length of the floor segments 158 such that the top of the floor segments is even with the top of the support beam 176. For an alternate embodiment, the floor segments 158 are made of a composite material. Also, for another alternative embodiment, the floor segments 158 are kept in place by gravity. This allows the user to remove and move the floor segments as desired. In yet another alternate embodiment, the floor segments may be secured in place with know methods including, for example, the use of nuts and bolts, VELCRO®, hooks and eyelets, ropes and eyelets, bolts and screws, snap-tight locking devices, or other types of fasteners.

FIG. 7e shows an angled top view of the floor segments 158 in place and level with the top of the support beam 176.

Figure 8:
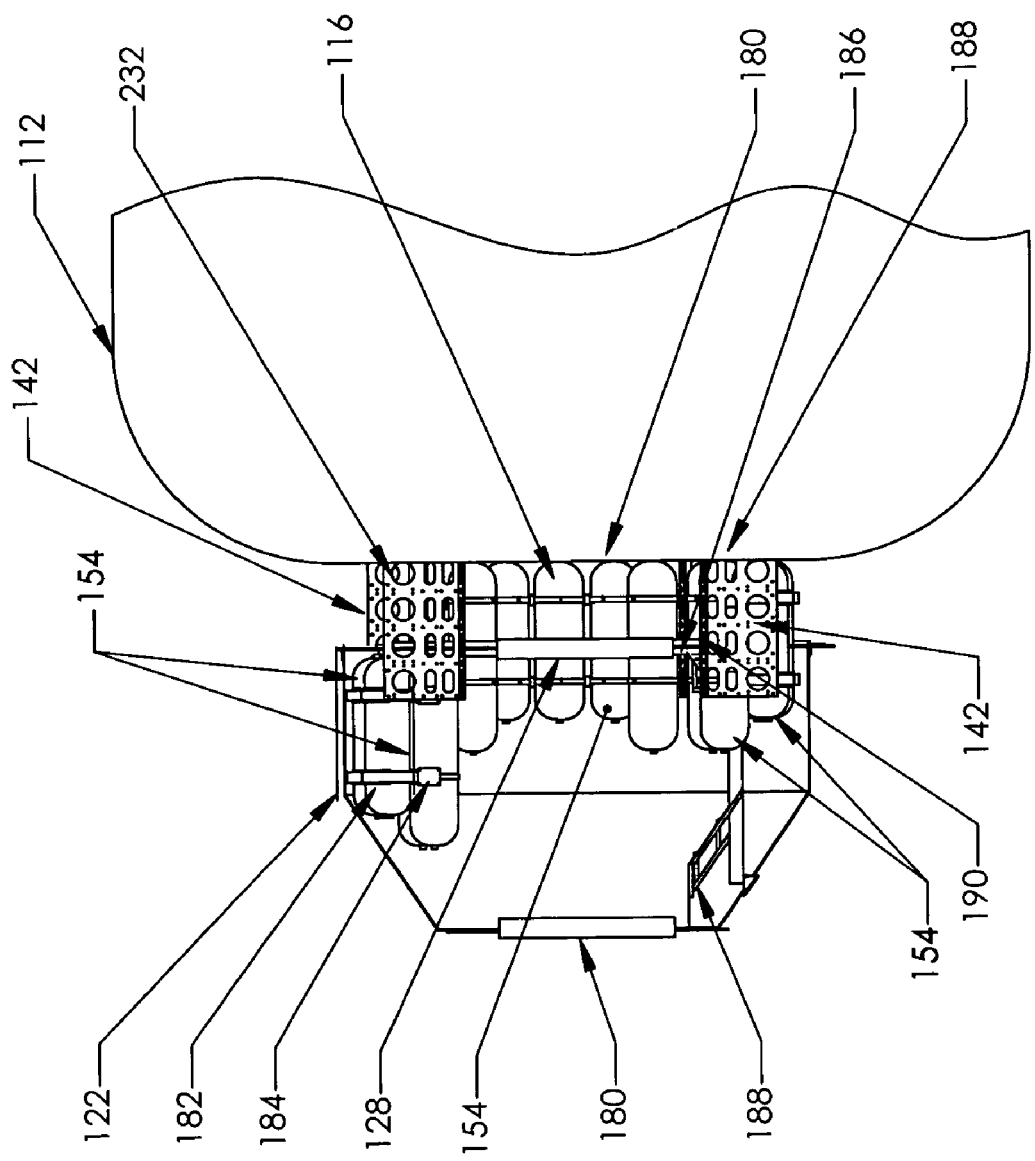
FIG. 8 is a partial cut-away isometric view of the first distal enclosure.

Turning now to FIG. 8, the first distal enclosure 122 is displayed in a cross-sectional view. The first distal enclosure 122 has two substantially opposed opening 180; one at each of the longitudinal ends of the first distal enclosure. Between the openings 180 there is a passage 128. The first distal enclosure 122 is connected to the housing 112 such that the openings 180 and passage 128 provide the access to the internal volume 130 from outside of the housing. After entering the opening 180, there is a platform. In the preferred embodiment, the platform is a stepped platform 186 with steps 188 going down, a platform 190, and steps 188 going upward to the first opening 116.

FIG. 8 also displays a number of cylinders 154 disposed within the first distal enclosure 122. The cylinders 154 are fixedly attached to the inside of the first distal enclosure 122 by means of straps 182 that are attached to the inside surface of the first distal enclosure 122. In the preferred embodiment, the straps 182 are made of a flexible metal, such as an aluminum alloy, are hingable, and have a clip 184 that is used to secure the cylinders 154 into place. The use of such straps 182 allows for the movement of cylinders 154 as desired by the user as well as allowing the user to vary the number of cylinders 154.

FIG. 8 also illustrates the longeron retainers 142. The longeron retainers are secured to the first distal enclosure 122 by conventional means such as by welding or nuts and bolts. In the preferred embodiment, the longerons 132 are made of aluminum or an aluminum alloy. The longerons 132 fit within the longeron retainers 142 and are connected to by conventionally known means including the use of nuts and bolts, or epoxy based adhesives. In the instances where the longerons 132 are made of steel, the longerons are connected to the second distal enclosures by means of nuts and bolts, or by welding.

In alternative embodiment, the longerons 132 do not enter into the body of the first distal enclosure, but rather attach to the bulkhead 232.

Figure 9:
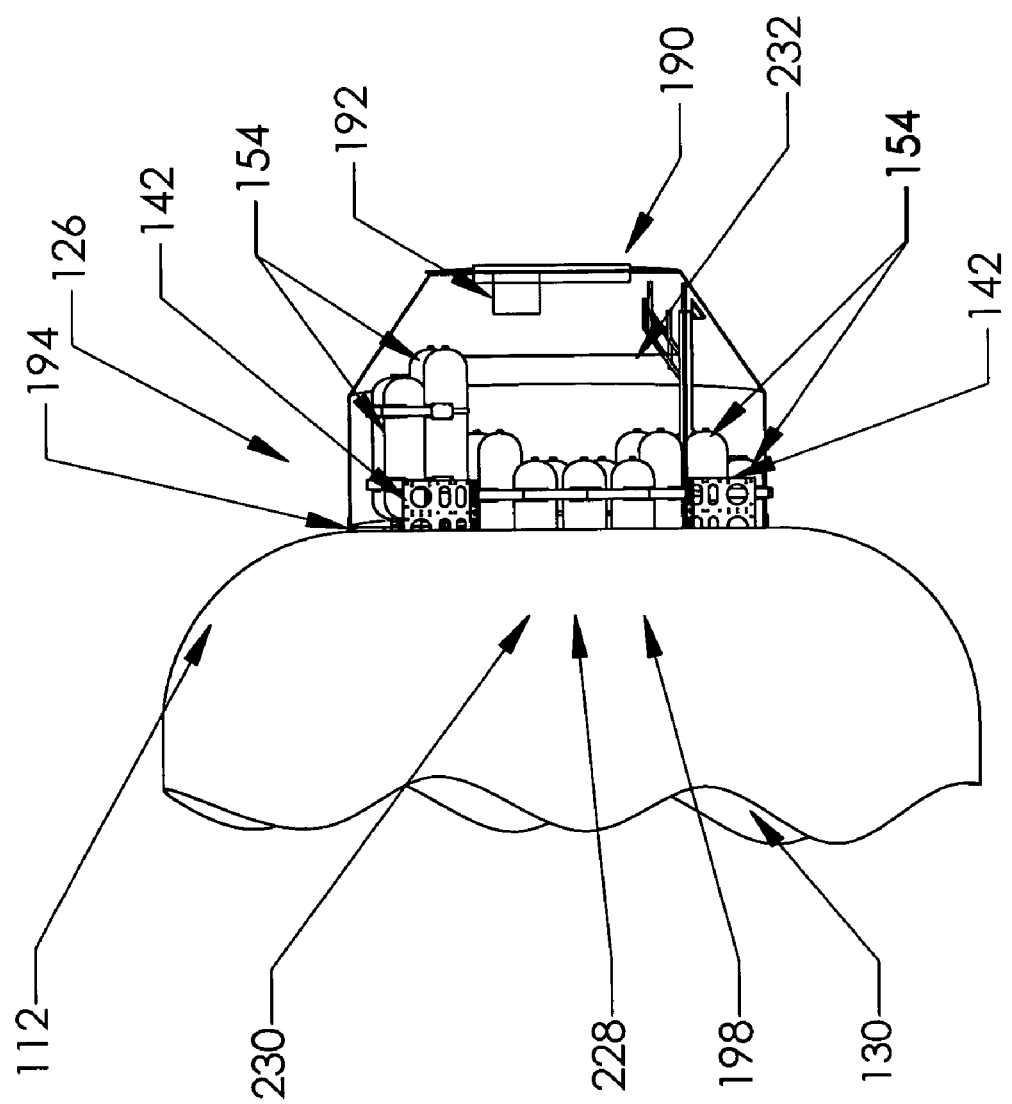
FIG. 9 is a partial cut-away isometric view of the second distal enclosure having one opening.

FIG. 9 shows the second distal enclosure 126. The second distal enclosure 126 is attached to the housing 112 in the same fashion as the first distal enclosure 122 described above and can be accessed from the internal volume 130 through an opening 180. As the figure depicts, the second distal enclosure 126 stores supplies such as cylinders 154 and other items 192. The cylinders 154 are secured in place within the second distal enclosure 126 by the same methods as discussed above for the cylinders 154 in the first distal enclosure 122. The other items 192 can take the form of electrical equipment, equipment stored within a container, food, medical supplies, or any other types of items used on the deployed module. While FIG. 9 illustrates a second distal enclosure 126 that is primarily used to store items, the second distal enclosure 126 is not limited to just storage.

The attachment of the longerons 132 are accomplished in the same manner as discussed above for the first distal enclosure 122.

The second distal enclosure 126 in FIG. 9 has a first end 194 with a first aperture 198 and a second end 196 that does not have an opening. The hollow interior 232 is where the cylinders 154 and other storage items are kept.

Figure 9A:
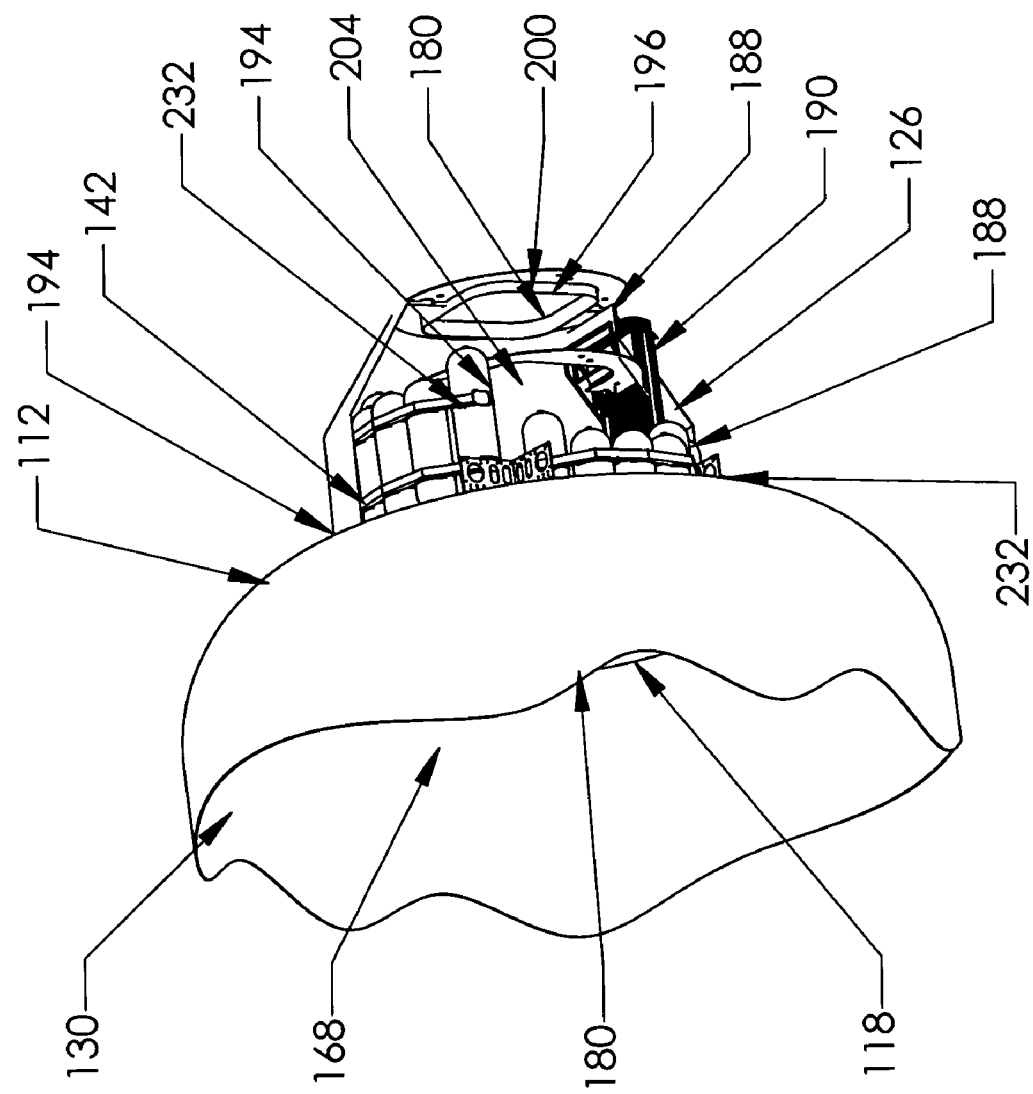
FIG. 9a is a partial cut-away isometric view of the second distal enclosure having two openings.

FIG. 9a is an illustration of the preferred embodiment of the second distal enclosure 126. The second distal enclosure 126 allows access to the internal volume 130 of the housing 112 in much the same was as was described as to the first distal enclosure 122. The second distal enclosure 126 has, a first aperture 198 at the first end 194 and a second aperture 200 at the second end 196. These are the opposing openings 180. There exists a passageway 204 within the hollow interior 202 and between the first aperture 198 and the second aperture 200. Thus, a crewmember can gain access into the internal volume 130 from outside the second distal enclosure 126. As with the first distal enclosure 122, the second distal enclosure 126 can also house cylinders 154 in the same way as the first distal enclosure 122 described above. In the preferred embodiment, the second distal enclosure 126 allows access into the internal volume 130 from outside of the modular human habitat simulator. As with the first distal enclosure, the second distal enclosure 126 has steps 188 and a platform 190 for use by crew members.

Again, the longerons 132 can be attached to the second distal enclosure 126 in the same manner as described above for the first distal enclosure 122. That includes the case where longeron retainers 142 or a bulkhead 232 is used depending upon the application desired.

Focusing now on FIG. 10, the housing is composed of a number of housing segments 206. In the preferred embodiment, the housing segments 206 are made of steel. The housing 112 is assembled by securing the housing segments 206 together by conventional means such as welding.

Figure 11:
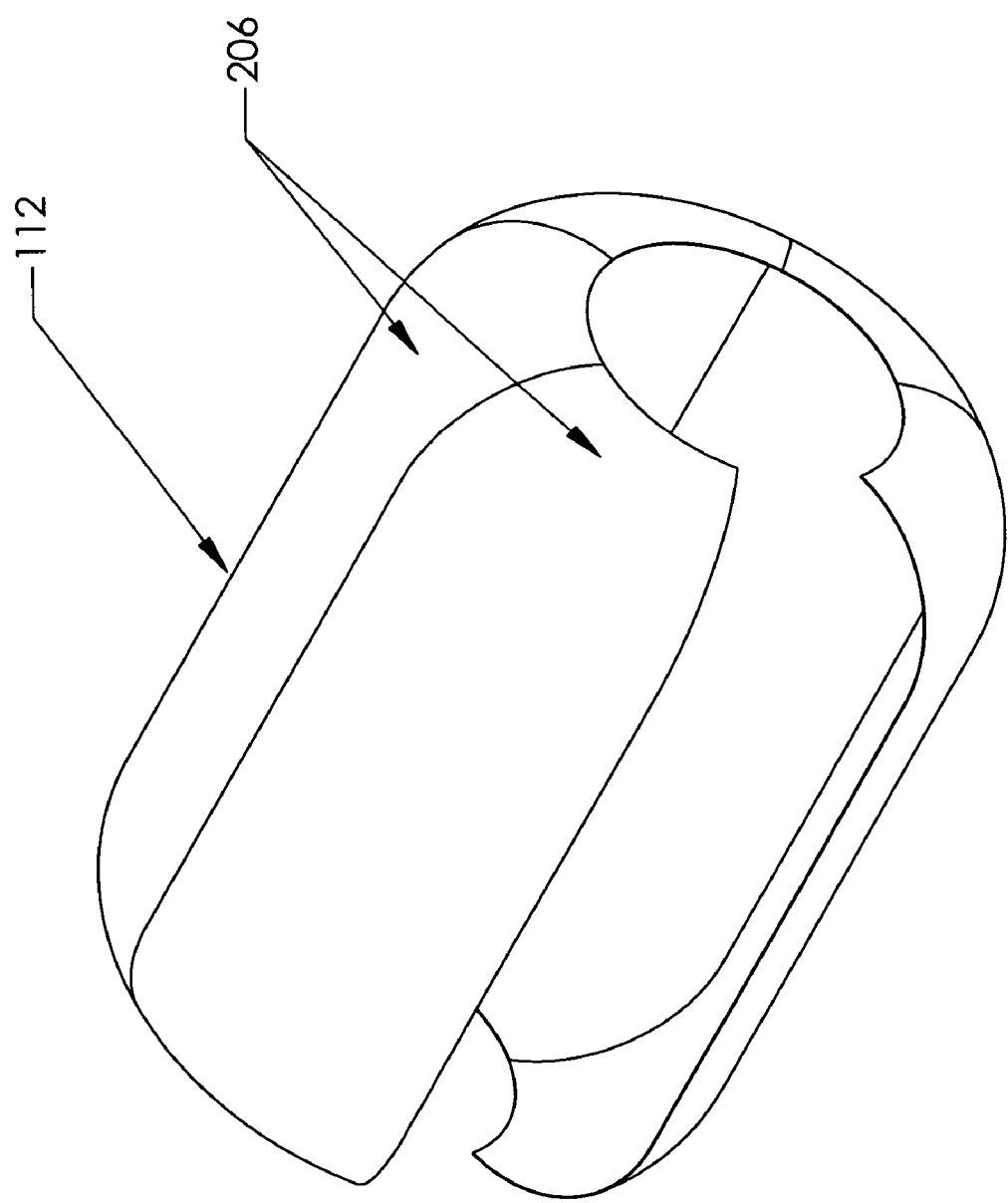
FIG. 11 is an isometric view of a number of housing segments joined together.
Figure 12:
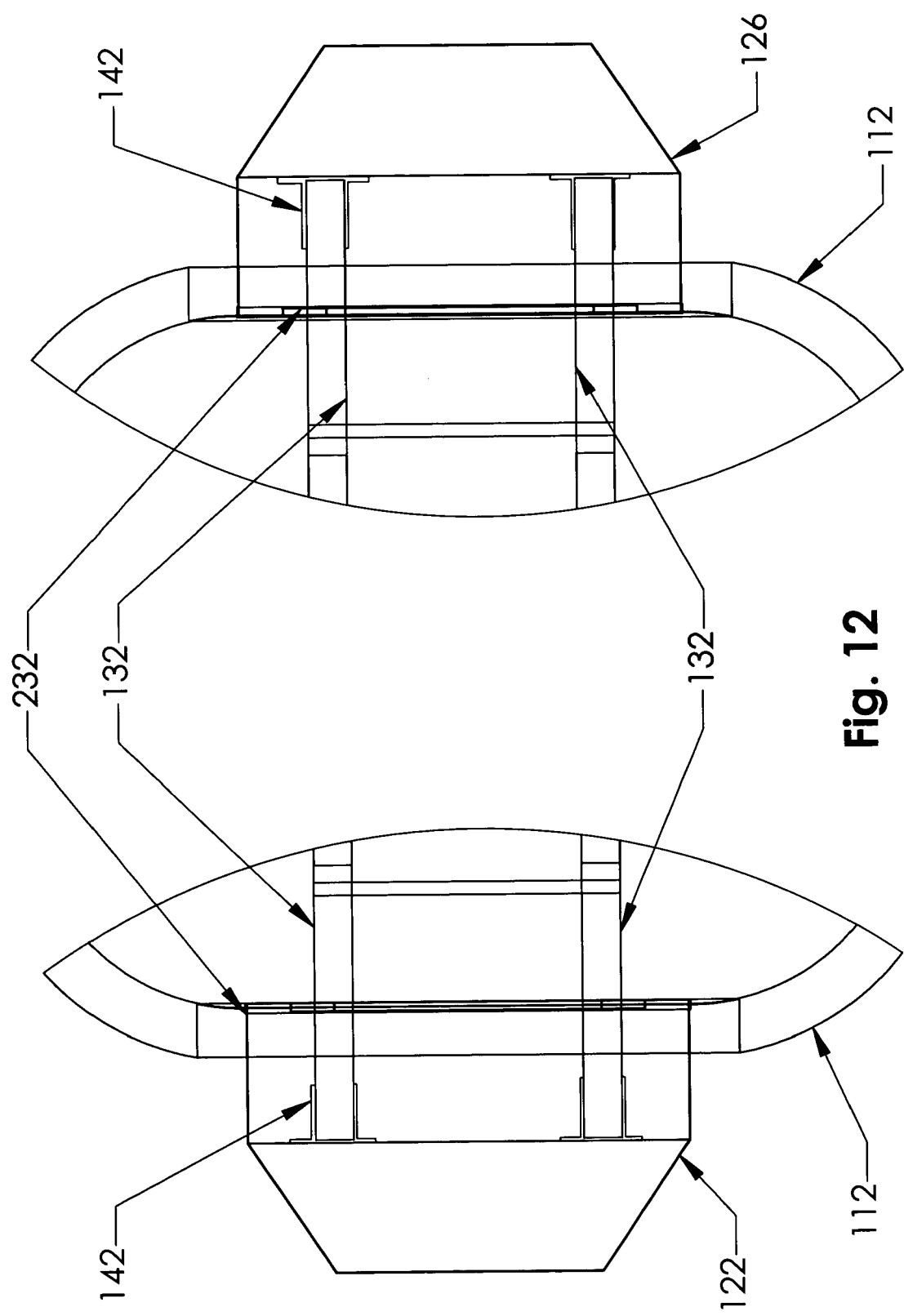
FIG. 12 is a partial cut-away isometric view of the distal housings.

Turning now to FIG. 11, a partially completed housing 112 is displayed having been assembled by combining the housing segments. Addressing FIG. 12, the longerons 132 fit within the housing 112 and into the first distal enclosure 122 and the second distal enclosure 126. The first and second distal enclosures are secured to the housing 112 by conventional means such as welding. The longerons 132 fit within longeron retainers 142 and are secured in place by conventional methods like welding or the use of epoxy based adhesives. In alternative embodiment, the longerons 132 are securely fixed to the bulkhead 232 by use of nuts and bolts, welding where the longerons 132 are steel, or the use of epoxy based adhesives.

There has thus been described a novel modular human habitat simulator. It is important to note that many configurations can be constructed from the ideas presented. The foregoing disclosure and description of the invention is illustrative and explanatory thereof and thus, nothing in the specification should be imported to limit the scope of the claims. Also, the scope of the invention is not intended to be limited to those embodiments described and includes equivalents thereto. It would be recognized by one skilled in the art the following claims would encompass a number of embodiments of the invention disclosed and claimed herein.

What is claimed is:

1. A modular human habitat simulator comprising:
   a housing having a rigid wall defining an internal volume, a longitudinal axis, a first opening and second opening being opposed along the longitudinal axis, an external surface, and the rigid wall having an interior surface of generally the shape of a deployed inflatable shell internal surface of a modular human habitat, and the internal volume being substantially that of a deployed inflatable modular human habitat volume;
   a first distal enclosure having a first end and a second end being opposed along a longitudinal axis, a first aperture on the first end and a second aperture on the second end forming a passage therethrough, and the first distal enclosure is connected to the housing such that the passage aligns with the first opening of the housing thereby providing access to the internal volume; and
   a second distal enclosure having a first end and a second end being opposed along a longitudinal axis, a hollow interior, and a first opening on the first end and the second distal enclosure being connected to the housing such that a passageway is formed between the hollow interior and the internal volume;
   the modular human habitat simulator further comprising:
   a plurality of simulated water bags fixedly attached to the interior surface;
   at least a portion of a simulated debris shield fixedly attached to the external surface; and
   a plurality of cylinders, wherein the cylinders simulate storage requirements of gases or liquids, wherein the number and location of the cylinders is dependent on a mission and experimental scenario.

2. The modular human habitat simulator according to claim 1 further comprising at least one longeron fixedly attached to, and extending from, the first distal enclosure through the internal volume and fixedly attached to the second distal enclosure.

3. The modular human habitat simulator according to claim 1 further comprising at least one window extending through the rigid wall into the internal volume.

4. The modular human habitat simulator according to claim 1 further comprising an opening on the second end of through the second distal enclosure thereby forming a passage to the internal volume.

5. The modular human habitat simulator according to claim 1 further comprising;
   a floor structure;
   means for supporting the floor structure; and
   the floor structure extending substantially the length of the longitudinal axis and substantially dividing the internal volume into an upper internal space and a lower internal space.

6. A modular human habitat simulator according to claim 5 further comprising at least one access opening in the floor structure.

7. The modular human habitat simulator according to claim 1 further comprising;
   a plurality of floor structures;
   means for supporting the plurality of floor structure; and
   the plurality of floor structures extending substantially the length of the longitudinal axis and substantially dividing the internal volume into a plurality of internal spaces.

8. A modular human habitat simulator according to claim 7 further comprising at least one access opening in at least one floor structure.

9. The modular human habitat simulator according to claim 1 wherein the cylinders are disposed within, and fixedly attached to, the first distal enclosure.

10. The modular human habitat simulator according to claim 1 wherein the cylinders are disposed within, and fixedly attached to, the second distal enclosure.

11. The modular human habitat simulator according to claim 1 wherein the cylinders are disposed along, and fixedly attached to, the external surface of the first distal enclosure.

12. The modular human habitat simulator according to claim 1 wherein the cylinders are disposed along, and fixedly attached to, the external surface of the second distal enclosure.

13. The modular human habitat simulator according to claim 1 further including a plurality of simulated panels fixedly attached to the interior surface.

14. The modular human habitat simulator according to claim 1 wherein the cylinders are fixedly attached to the interior surface.

15. A modular human habitat simulator comprising:
a housing having a substantially rigid wall defining an internal volume, a longitudinal axis, a first opening and a second opening being opposed along the longitudinal axis, an external surface, and the substantially rigid wall having an interior surface of generally the shape of a deployed inflatable shell internal surface of a modular human habitat, and the internal volume being substantially that of a deployed inflatable modular human habitat volume;
a first distal enclosure having a first end and a second end being opposed along a longitudinal axis, a first aperture on the first end and a second aperture on the second end forming a passage therethrough, and the first distal enclosure is connected to the housing such that the passage aligns with the first opening of the housing thereby providing access to the internal volume;
a second distal enclosure having a first end and a second end being opposed along a longitudinal axis, a hollow interior, and a first opening on the first end and the second distal enclosure being connected to the housing such that a passageway is formed between the hollow interior and the internal volume; and
at least one longeron fixedly attached to, and extending from, the first distal enclosure through the internal volume and fixedly attached to the second distal enclosure;
the modular human habitat simulator further comprising:
a plurality of simulated water bags fixedly attached to the interior surface;
at least a portion of a simulated debris shield fixedly attached to the external surface; and
a plurality of cylinders, wherein the cylinders simulate storage requirements of gases or liquids, wherein the number and location of the cylinders is dependent on a mission and experimental scenario.

16. A method of constructing a modular human habitat simulator comprising the steps of;
providing a plurality of housing segments;
assembling the housing segments into a housing having an internal volume, a first opening and second opening opposed along a longitudinal axis;
inserting at least one longeron into the internal volume;
attaching a first distal enclosure having a passage therethrough over the first opening such that the internal volume is accessible through the passage;
attaching the first distal enclosure to the longeron;
attaching a second distal enclosure having a hollow interior over the second opening such that a passageway is formed between the internal volume and the hollow interior; and
attaching the second distal enclosure to the longeron; wherein the at least one longeron is not required to be fully functional;
attaching a plurality of simulated water bags to an interior surface of the housing;
attaching at least a portion of a simulated debris shield to an external surface of the housing; placing a plurality of cylinders within the first distal enclosure, second distal enclosure, and the internal volume of the housing, wherein the cylinders simulate storage requirements of gases or liquids, wherein the number and location of the cylinders is dependent on a mission and experimental scenario.

17. A method of constructing a modular human habitat simulator comprising the steps of;
providing a plurality of housing segments;
assembling the housing segments into a housing having an internal volume, a first opening and second opening opposed along a longitudinal axis;
inserting at least one longeron into the internal volume;
attaching a first distal enclosure having a passage therethrough to the housing such that the passage coincides with the first opening of the housing;
attaching the first distal enclosure to the longeron;
attaching a second distal enclosure having a passageway therethrough to the housing such that the passageway coincides with the first opening of the housing; and
attaching the second distal enclosure to the longeron; wherein the at least one longeron is not required to be fully functional;
attaching a plurality of simulated water bags to an interior surface of the housing;
attaching at least a portion of a simulated debris shield to an external surface of the housing; and placing a plurality of cylinders within the first distal enclosure, second distal enclosure, and the internal volume of the housing, wherein the cylinders simulate storage requirements of gases or liquids, wherein the number and location of the cylinders is dependent on a mission and experimental scenario.

* * * * *